(12) United States Patent
Kiukkonen et al.

(10) Patent No.: US 9,258,712 B2
(45) Date of Patent: Feb. 9, 2016

(54) METHOD, APPARATUS, AND COMPUTER PROGRAM PRODUCT FOR SHARING WIRELESS NETWORK CONFIGURATIONS

(75) Inventors: Niko Kiukkonen, Veikkola (FI); Janne Marin, Espoo (FI); Jukka Reunamäki, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/602,492

(22) Filed: Sep. 4, 2012

(65) Prior Publication Data
US 2014/0068719 A1 Mar. 6, 2014

(51) Int. Cl.
| | |
|---|---|
| H04L 29/06 | (2006.01) |
| G06F 21/00 | (2013.01) |
| H04W 12/08 | (2009.01) |
| H04L 12/28 | (2006.01) |
| H04L 29/10 | (2006.01) |
| H04W 84/12 | (2009.01) |

(52) U.S. Cl.
CPC .............. *H04W 12/08* (2013.01); *H04W 84/12* (2013.01)

(58) Field of Classification Search
CPC ................................ H04W 12/08; H04W 84/12
USPC ............................................. 726/4; 455/410
See application file for complete search history.

(56) References Cited

U.S. PATENT DOCUMENTS

| | | | |
|---|---|---|---|
| 6,907,568 | B1 | 6/2005 | Meyers |
| 7,986,782 | B2 | 7/2011 | Meyers |
| 2006/0251256 | A1* | 11/2006 | Asokan et al. ................ 380/270 |
| 2007/0254630 | A1* | 11/2007 | Moloney et al. .............. 455/410 |
| 2012/0311661 | A1* | 12/2012 | Forssell ............................ 726/1 |

FOREIGN PATENT DOCUMENTS

GB 2426159 A * 11/2006 .............. H04L 29/10

OTHER PUBLICATIONS

Haojin Zhu; Xiaodong Lin; Minghui Shi; Pin-han Ho; Xuemin Shen; "PPAB: A Privacy-Preserving Authentication and Billing Architecture for Metropolitan Area Sharing Networks"; Vehicular Technology, IEEE Transactions on Year: Jun. 2009; vol. 58, Issue: 5; pp. 2529-2543.*

* cited by examiner

*Primary Examiner* — Kambiz Zand
*Assistant Examiner* — Courtney Fields
(74) *Attorney, Agent, or Firm* — Locke Lord LLP

(57) ABSTRACT

Example method, apparatus, and computer program product embodiments are disclosed to improve user experience and security in sharing wireless network configurations. An embodiment comprises reading, by a guest wireless device, data from a machine readable medium, including accessing information, to enable the guest device to obtain credentials from an access rights server, to access an access point or network, based on the accessing information; transmitting by the guest device, a wireless message to the access rights server, requesting credentials to enable accessing the access point or network, the request including the accessing information addressing a storage partition in a database associated with the access rights server, the storage partition being accessible with the accessing information; and receiving by the guest device from the access rights server, the credentials to enable the guest device to gain access to the access point or network by using the credentials.

22 Claims, 18 Drawing Sheets

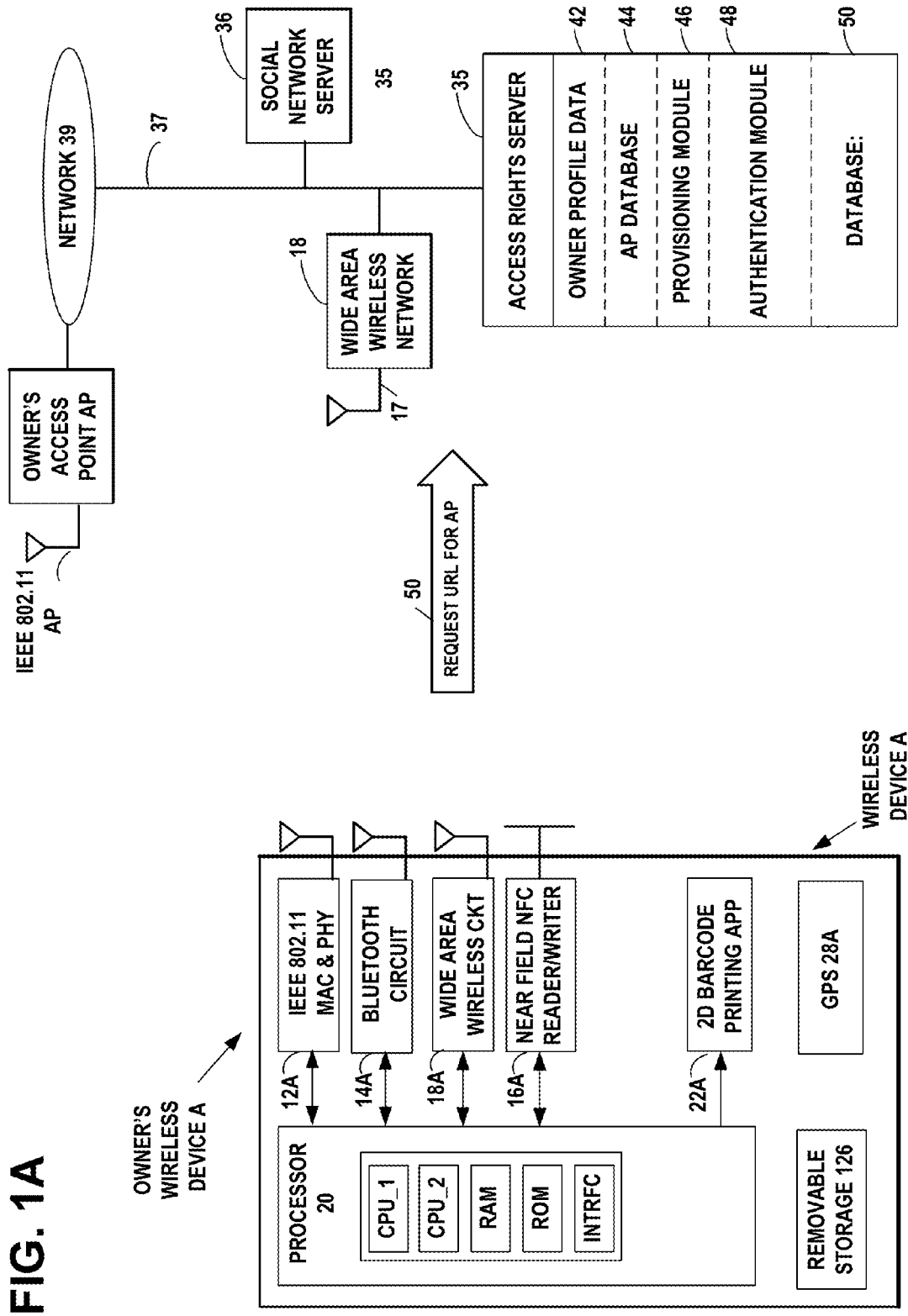

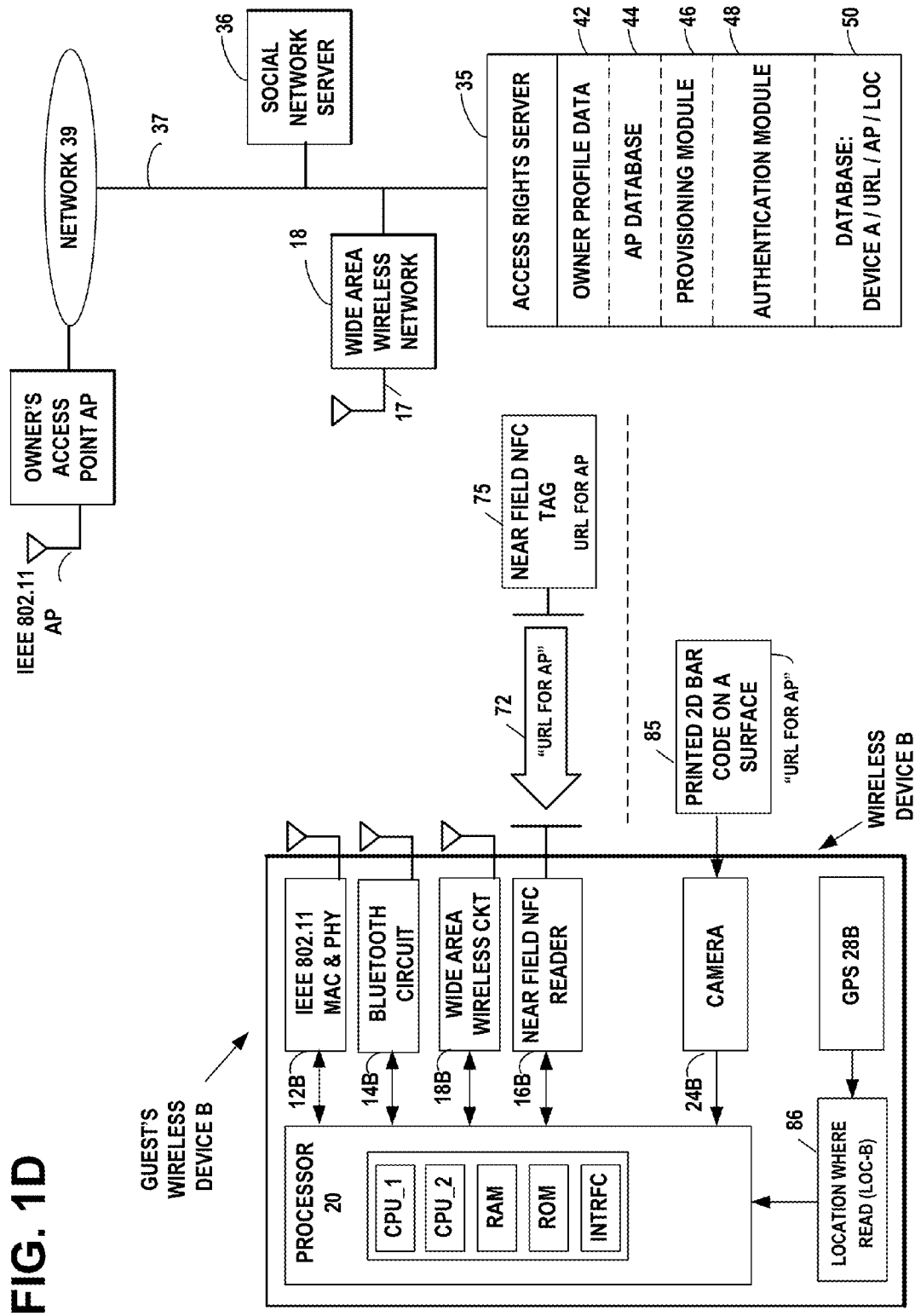

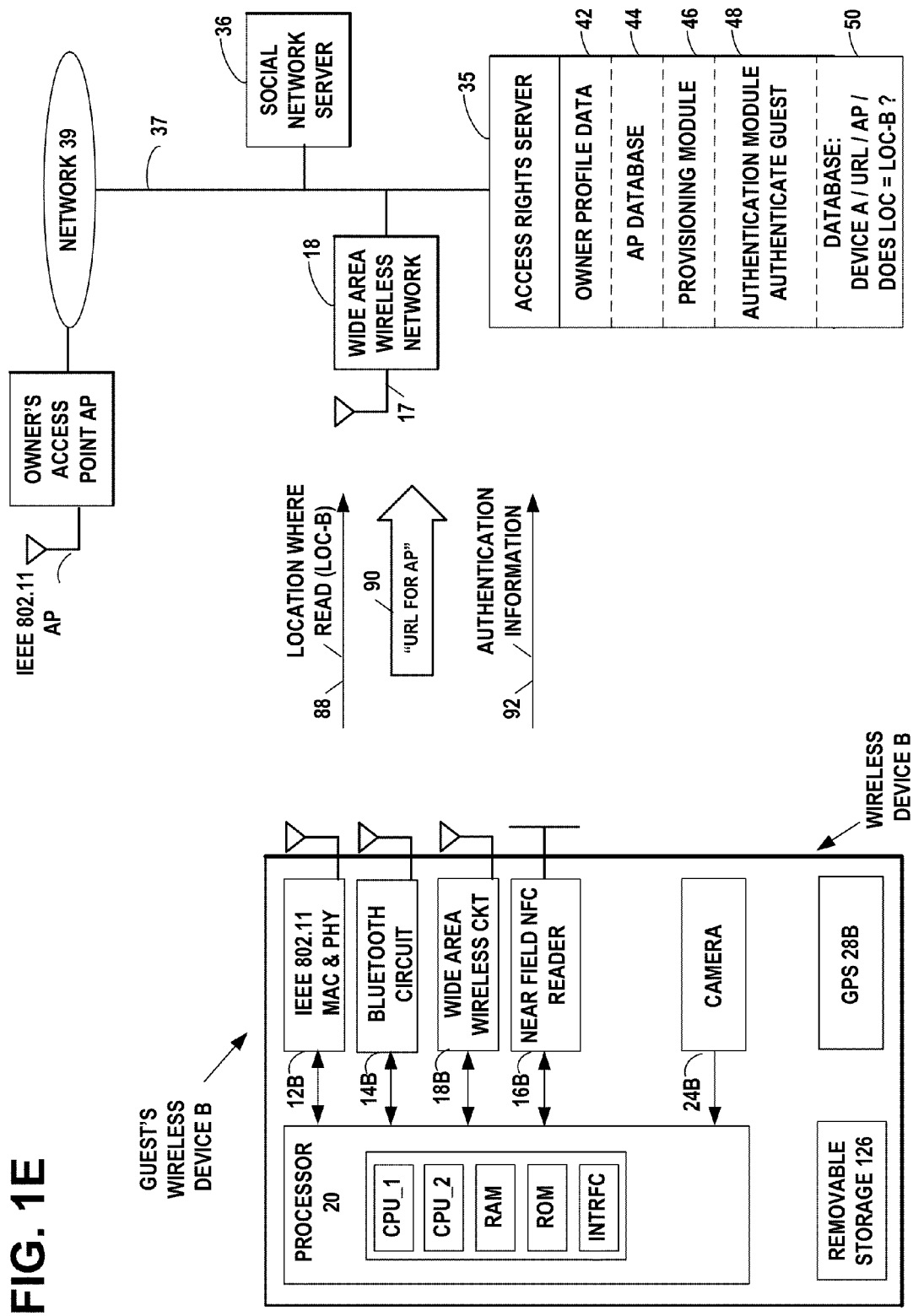

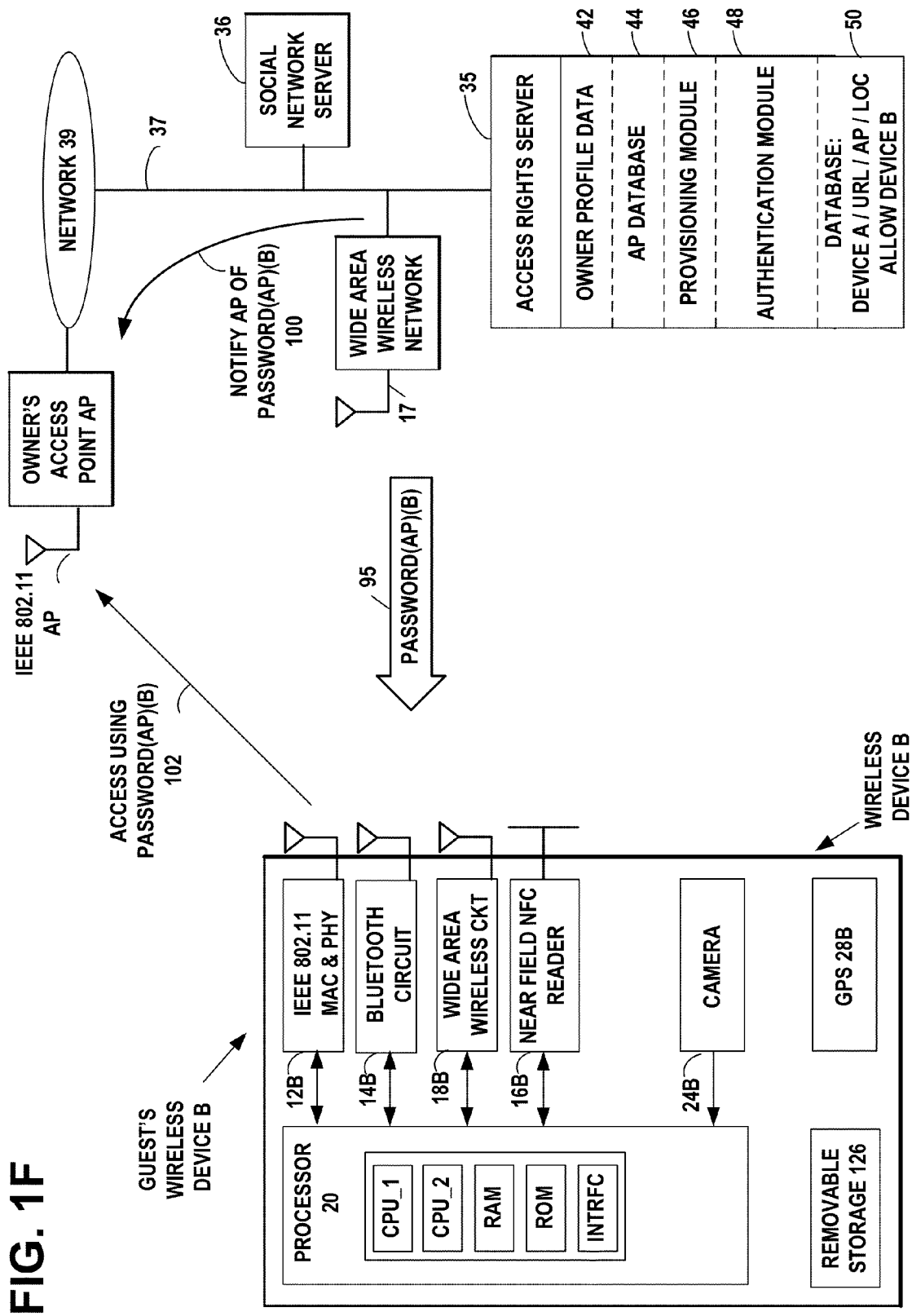

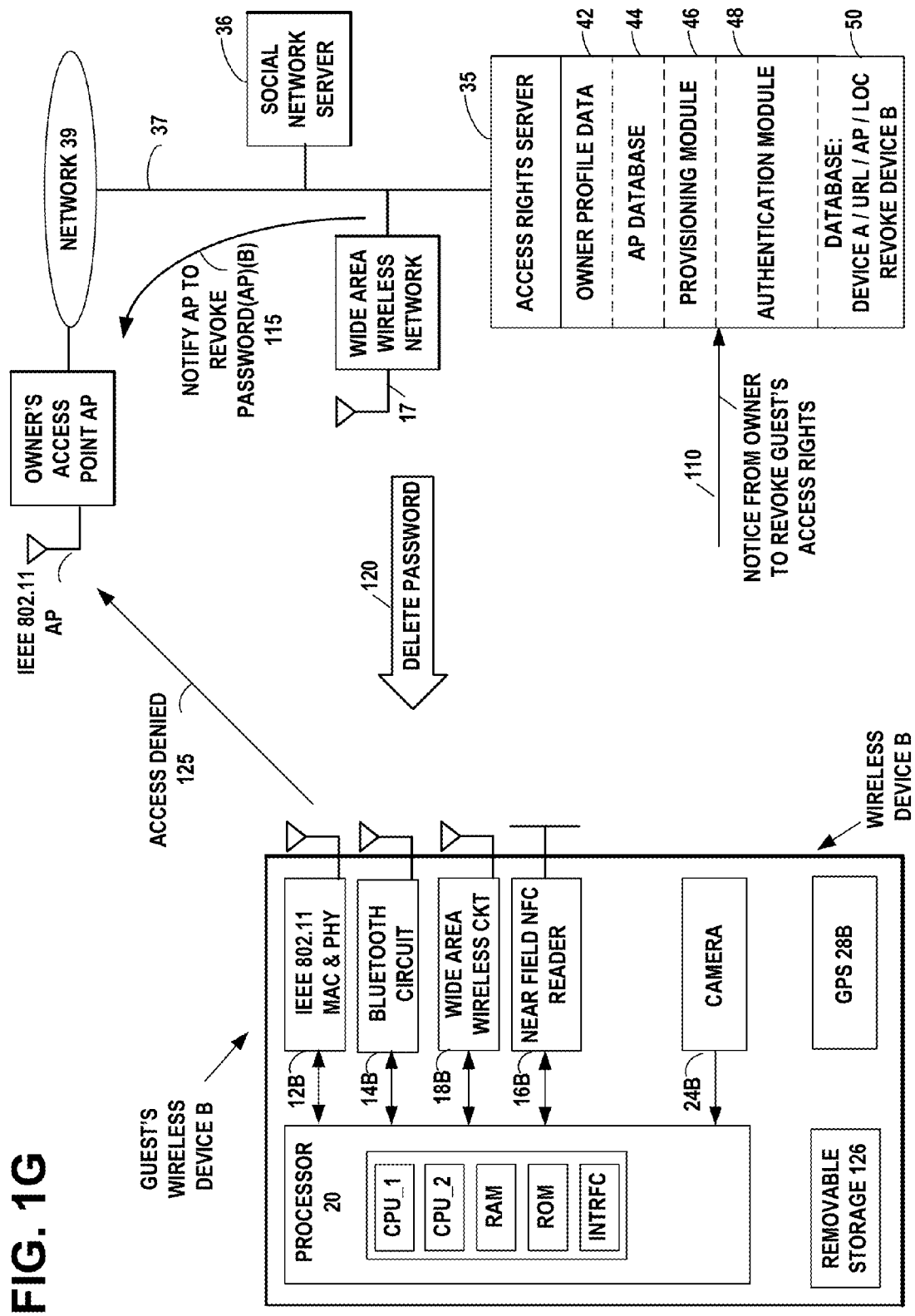

STEP 402: TRANSMITTING BY A FIRST WIRELESS DEVICE, TO AN ACCESS RIGHTS SERVER, A WIRELESS MESSAGE INCLUDING A REQUEST FOR ACCESSING INFORMATION TO ADDRESS A STORAGE PARTITION IN A DATABASE ASSOCIATED WITH THE ACCESS RIGHTS SERVER, WHICH STORES CREDENTIALS TO ACCESS AN ACCESS POINT THAT IS OWNED OR MANAGED BY A USER OF THE FIRST DEVICE;

STEP 404: RECEIVING BY THE FIRST WIRELESS DEVICE A RESPONSIVE WIRELESS MESSAGE FROM THE ACCESS RIGHTS SERVER, INCLUDING ACCESSING INFORMATION ENABLING GUEST DEVICES TO OBTAIN ACCESS RIGHTS FOR THE ACCESS POINT FROM THE STORAGE PARTITION IN THE DATABASE ASSOCIATED WITH THE ACCESS RIGHTS SERVER, THE STORAGE PARTITION BEING ACCESSIBLE WITH THE ACCESSING INFORMATION; AND

STEP 406: WRITING BY THE FIRST WIRELESS DEVICE, DATA INTO A MACHINE-READABLE MEDIUM, INCLUDING THE ACCESSING INFORMATION, TO ENABLE A GUEST WIRELESS DEVICE THAT HAS READ THE ACCESSING INFORMATION FROM THE MACHINE-READABLE MEDIUM, TO OBTAIN FROM THE ACCESS RIGHTS SERVER, ACCESS RIGHTS TO ACCESS THE ACCESS POINT, BASED ON THE ACCESSING INFORMATION.

FIG. 4B

STEP 452: READING, BY A GUEST WIRELESS DEVICE, DATA FROM A MACHINE READABLE MEDIUM, INCLUDING ACCESSING INFORMATION, TO ENABLE THE GUEST WIRELESS DEVICE TO OBTAIN CREDENTIALS FROM AN ACCESS RIGHTS SERVER, TO ACCESS AN ACCESS POINT, BASED ON THE ACCESSING INFORMATION;

STEP 454: TRANSMITTING BY THE GUEST WIRELESS DEVICE, A WIRELESS MESSAGE TO THE ACCESS RIGHTS SERVER, REQUESTING CREDENTIALS TO ENABLE ACCESSING THE ACCESS POINT, THE REQUEST INCLUDING THE ACCESSING INFORMATION, THE ACCESSING INFORMATION ADDRESSING A STORAGE PARTITION IN A DATABASE ASSOCIATED WITH THE ACCESS RIGHTS SERVER, THE STORAGE PARTITION BEING ACCESSIBLE WITH THE ACCESSING INFORMATION; AND

STEP 456: RECEIVING BY THE GUEST WIRELESS DEVICE FROM THE ACCESS RIGHTS SERVER, THE CREDENTIALS TO ENABLE THE GUEST WIRELESS DEVICE TO GAIN ACCESS TO THE ACCESS POINT BY USING THE CREDENTIALS.

STEP 472: TRANSMITTING BY A FIRST DEVICE, TO AN ACCESS RIGHTS SERVER, A MESSAGE INCLUDING A REQUEST FOR ACCESS INFORMATION TO ADDRESS A STORAGE PARTITION IN A DATABASE ASSOCIATED WITH THE ACCESS RIGHTS SERVER, WHICH STORES CREDENTIALS TO ACCESS A WIRELESS ACCESS POINT OR NETWORK THAT IS OWNED OR MANAGED BY A USER OF THE FIRST DEVICE;

STEP 474: RECEIVING BY THE FIRST DEVICE A RESPONSIVE MESSAGE FROM THE ACCESS RIGHTS SERVER, INCLUDING ACCESS INFORMATION ENABLING GUEST DEVICES TO OBTAIN ACCESS RIGHTS FOR THE WIRELESS ACCESS POINT OR NETWORK FROM THE STORAGE PARTITION IN THE DATABASE ASSOCIATED WITH THE ACCESS RIGHTS SERVER; AND

STEP 476: PROVIDING, BY THE FIRST DEVICE, THE ACCESS INFORMATION TO A GUEST DEVICE TO ENABLE THE GUEST DEVICE TO OBTAIN FROM THE ACCESS RIGHTS SERVER, ACCESS RIGHTS TO ACCESS THE WIRELESS ACCESS POINT OR NETWORK, BASED ON THE ACCESS INFORMATION.

STEP 492: READING, BY A GUEST WIRELESS DEVICE, DATA FROM A MACHINE READABLE MEDIUM, INCLUDING ACCESSING INFORMATION, TO ENABLE THE GUEST WIRELESS DEVICE TO OBTAIN CREDENTIALS FROM AN ACCESS RIGHTS SERVER, TO ACCESS A WIRELESS ACCESS POINT OR NETWORK, BASED ON THE ACCESSING INFORMATION;

STEP 494: TRANSMITTING BY THE GUEST WIRELESS DEVICE, A WIRELESS MESSAGE TO THE ACCESS RIGHTS SERVER, REQUESTING CREDENTIALS TO ENABLE ACCESSING THE WIRELESS ACCESS POINT OR NETWORK, THE REQUEST INCLUDING THE ACCESSING INFORMATION, THE ACCESSING INFORMATION ADDRESSING A STORAGE PARTITION IN A DATABASE ASSOCIATED WITH THE ACCESS RIGHTS SERVER, THE STORAGE PARTITION BEING ACCESSIBLE WITH THE ACCESSING INFORMATION; AND

STEP 496: RECEIVING BY THE GUEST WIRELESS DEVICE FROM THE ACCESS RIGHTS SERVER, THE CREDENTIALS TO ENABLE THE GUEST WIRELESS DEVICE TO GAIN ACCESS TO THE WIRELESS ACCESS POINT OR NETWORK BY USING THE CREDENTIALS.

METHOD, APPARATUS, AND COMPUTER PROGRAM PRODUCT FOR SHARING WIRELESS NETWORK CONFIGURATIONS

FIELD

The field of the invention relates to wireless communication, and more particularly to improving user experience and security in sharing wireless network configurations.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other short-range communication technologies include Bluetooth™ Low Energy, IEEE 802.11 wireless local area network (WLAN), Wireless USB, ZigBee (IEEE 802.15.4, IEEE 802.15.4a), and ultra high frequency radio frequency identification (UHF RFID) technologies. All of these wireless communication technologies have features and advantages that make them appropriate for various applications.

Near field communication technologies, such as radio frequency identification (RFID) technologies, comprise a range of RF transmission systems, for example standardized and proprietary systems for a large number of different purposes, such as product tagging for inventory handling and logistics, theft prevention purposes at the point of sale, and product recycling at the end of the life-cycle of the tagged product. In addition to RFID technologies, Near Field Communication (NFC) technology has recently evolved from a combination of existing contactless identification and interconnection technologies. NFC is both a "read" and "write" technology. Communication between two NFC-compatible devices occurs when they are brought within close proximity of each other: A simple wave or touch can establish an NFC connection that may be used to exchange specific information for another communications protocol, which may then be used to create an actual connection in the other communications protocol, such as Bluetooth™ or wireless local area network (WLAN).

SUMMARY

Example method, apparatus, and computer program product embodiments are disclosed to improve user experience and security in sharing wireless network configurations.

Example embodiments of the invention include a method comprising:

transmitting, by a first device, to an access rights server a message including a request for access information to address a storage partition in a database associated with the access rights server, which stores credentials to access a wireless access point or network identified in the request;

receiving, by the first device, a responsive message from the access rights server, including access information enabling guest devices to obtain access rights for the wireless access point or network from the storage partition in the database associated with the access rights server, if a user of the first device is authorized to share access information for the wireless access point or network; and providing, by the first device, the access information to a guest device to enable the guest device to obtain from the access rights server, access rights to access the wireless access point or network, based on the access information.

Example embodiments of the invention include a method comprising:

writing by the first wireless device, data into a machine-readable medium, including the access information, to enable a guest device to obtain from the access rights server, access rights to access the wireless access point or network, based on the access information in response to reading the access information from the machine-readable medium.

Example embodiments of the invention include a method comprising:

wherein the message transmitted by the first device to the access rights server, includes condition information specified by the first device to be stored in the storage partition in the database, which is at least one of a specification of an interval within which the guest device may access the wireless access point or network and a specification of a location of installation of the machine readable medium.

Example embodiments of the invention include a method comprising:

wherein the user of the first device is an owner or manager of the wireless access point or network identified in the request.

Example embodiments of the invention include an apparatus comprising:

at least one processor;

at least one memory including computer program code;

the at least one memory and the computer program code configured to, with the at least one processor, cause the apparatus at least to:

transmit to an access rights server a message including a request for access information to address a storage partition in a database associated with the access rights server, which stores credentials to access a wireless access point or network identified in the request;

receive a responsive message from the access rights server, including access information enabling guest devices to obtain access rights for the wireless access point or network from the storage partition in the database associated with the access rights server, if a user of the apparatus is authorized to share access information for the wireless access point or network; and provide the access information to a guest device to enable the guest device to obtain from the access rights server, access rights to access the wireless access point or network, based on the access information.

Example embodiments of the invention include an apparatus comprising:

the at least one memory and the computer program code configured to, with the at least one processor, cause the apparatus at least to:

write data into a machine-readable medium, including the access information, to enable a guest device to obtain from the access rights server, access rights to access the wireless access point or network, based on the access information in response to reading the access information from the machine-readable medium.

Example embodiments of the invention include an apparatus comprising:

wherein the machine-readable medium is at least one of a near field communication tag and a two-dimensional bar-coded surface.

Example embodiments of the invention include a computer program product comprising computer executable program code recorded on a computer readable non-transitory storage medium, the computer executable program code comprising:

code for transmitting, by a first device, to an access rights server a message including a request for access information to address a storage partition in a database associated with the access rights server, which stores credentials to access a wireless access point or network identified in the request;

code for receiving, by the first device, a responsive message from the access rights server, including access information enabling guest devices to obtain access rights for the wireless access point or network from the storage partition in the database associated with the access rights server, if a user of the first device is authorized to share access information for the wireless access point or network; and code for providing, by the first device, the access information to a guest device to enable the guest device to obtain from the access rights server, access rights to access the wireless access point or network, based on the access information.

Example embodiments of the invention include a method comprising:

reading, by a guest wireless device, data from a machine readable medium, including accessing information, to enable the guest wireless device to obtain credentials from an access rights server, to access a wireless access point or network, based on the accessing information;

transmitting by the guest wireless device, a wireless message to the access rights server, requesting credentials to enable accessing the wireless access point or network, the request including the accessing information, the accessing information addressing a storage partition in a database associated with the access rights server, the storage partition being accessible with the accessing information; and receiving by the guest wireless device from the access rights server, the credentials to enable the guest wireless device to gain access to the wireless access point or network by using the credentials.

Example embodiments of the invention include a method comprising:

storing, by the guest device, a location indication representing a location where the guest wireless device read the data from the machine readable medium; and transmitting, by the guest wireless device to the access rights server, the location information to confirm that the machine-readable medium was not moved from a location where it was installed.

Example embodiments of the invention include a method comprising:

wherein the credentials received by the guest device, include a specification of an interval within which the guest device may access the wireless access point or network.

Example embodiments of the invention include an apparatus comprising:

at least one processor;

at least one memory including computer program code;

the at least one memory and the computer program code configured to, with the at least one processor, cause the apparatus at least to:

read data from a machine readable medium, including accessing information, to enable the apparatus to obtain from an access rights server, credentials to access a wireless access point or network, based on the accessing information;

transmit a wireless message to the access rights server, requesting credentials to enable accessing the wireless access point or network, the request including the accessing information, the accessing information addressing a storage partition in a database associated with the access rights server, the storage partition being accessible with the accessing information; and receive from the access rights server, the credentials to enable the apparatus to gain access to the wireless access point or network by using the credentials.

Example embodiments of the invention include an apparatus comprising:

the at least one memory and the computer program code configured to, with the at least one processor, cause the apparatus at least to:

store a location indication representing a location where the guest wireless device read the data from the machine readable medium; and transmit to the access rights server, the location information to confirm that the machine-readable medium was not moved from a location where it was installed.

Example embodiments of the invention include an apparatus comprising:

wherein the credentials received by the guest device, include a specification of an interval within which the guest device may access the wireless access point or network.

Example embodiments of the invention include a computer program product comprising computer executable program code recorded on a computer readable non-transitory storage medium, the computer executable program code comprising:

code for reading, by a guest wireless device, data from a machine readable medium, including accessing information, to enable the guest wireless device to obtain from an access rights server, credentials to access a wireless access point or network, based on the accessing information;

code for transmitting by the guest wireless device, a wireless message to the access rights server, requesting credentials to enable accessing the wireless access point or network, the request including the accessing information, the accessing information addressing a storage partition in a database associated with the access rights server, the storage partition being accessible with the accessing information; and code for receiving by the guest wireless device from the access rights server, the credentials to enable the guest wireless device to gain access to the wireless access point or network by using the credentials.

Example embodiments of the invention include a method comprising:

maintaining, by an access rights server, a list of wireless access points or networks, an associated list of users or devices that have rights to distribute credentials for accessing one or more of the access points or networks, and an associated database including a storage partition that stores credentials to access the wireless access points or networks;

receiving, by the access rights server, a message from a first device, including a request for accessing information to address the storage partition in the database associated with the access rights server, which stores credentials to access the wireless access point or network identified in the request;

determining, by the access rights server, whether a user of the first device is authorized to share access information for the wireless access point or network identified in the request; and generating, by the access rights server, and transmitting back to the first device in response to the request, accessing information enabling guest wireless devices to obtain access rights for the wireless access point or network identified in the request, from the storage partition in the database associated with the access rights server, if the user of the first device is authorized to share access information for the wireless access point or network identified in the request, the storage partition being accessible with the accessing information.

Example embodiments of the invention include a method comprising:

receiving, by the access rights server, from a guest wireless device, a message requesting credentials to enable accessing the wireless access point or network, the request including the accessing information to address the storage partition in the database associated with the access rights server, the request further including authentication information to enable the access rights server to authenticate the guest wireless device;

authenticating, by the access rights server, the guest wireless device; and transmitting, by the access rights server, the credentials to the guest wireless device to enable it to gain access to the wireless access point or network by using the credentials.

Example embodiments of the invention include an apparatus comprising:

at least one processor;

at least one memory including computer program code;

the at least one memory and the computer program code configured to, with the at least one processor, cause the apparatus at least to:

maintain a list of wireless access points or networks, an associated list of users or devices that have rights to distribute credentials for accessing one or more of the access points or networks, and an associated database including a storage partition that stores credentials to access the wireless access points or networks;

receive a message from a first device, including a request for accessing information to address the storage partition in the database associated with the apparatus, which stores credentials to access the wireless access point or network identified in the request;

determine whether a user of the first device is authorized to share access information for the wireless access point or network identified in the request; and generate and transmit back to the first device in response to the request, accessing information enabling guest wireless devices to obtain access rights for the wireless access point or network identified in the request, from the storage partition in the database associated with the apparatus, if the user of the first device is authorized to share access information for the wireless access point or network identified in the request, the storage partition being accessible with the accessing information.

Example embodiments of the invention include an apparatus comprising:

the at least one memory and the computer program code configured to, with the at least one processor, cause the apparatus at least to:

receive from a guest wireless device, a message requesting credentials to enable accessing the wireless access point or network, the request including the accessing information to address the storage partition in the database associated with the apparatus, the request further including authentication information to enable the access rights server to authenticate the guest wireless device;

authenticate the guest wireless device; and transmit the credentials to the guest wireless device to enable it to gain access to the wireless access point or network by using the credentials.

Example embodiments of the invention include a computer program product comprising computer executable program code recorded on a computer readable non-transitory storage medium, the computer executable program code comprising:

code for maintaining, by an access rights server, a list of wireless access points or networks, an associated list of users or devices that have rights to distribute credentials for accessing one or more of the access points or networks, and an associated database including a storage partition that stores credentials to access the wireless access points or networks;

code for receiving, by the access rights server, a message from a first device, including a request for accessing information to address the storage partition in the database associated with the access rights server, which stores credentials to access the wireless access point or network identified in the request;

code for determining, by the access rights server, whether a user of the first device is authorized to share access information for the wireless access point or network identified in the request; and code for generating, by the access rights server, and transmitting back to the first device in response to the request, accessing information enabling guest wireless devices to obtain access rights for the wireless access point or network identified in the request, from the storage partition in the database associated with the access rights server, if the user of the first device is authorized to share access information for the wireless access point or network identified in the request, the storage partition being accessible with the accessing information.

Example embodiments of the invention include a system comprising:

a first device;

a wireless access point or network device;

an access rights server;

the first device configured to transmit a message to the access rights server, including a request for accessing information to address a storage partition in a database associated with the access rights server, which stores credentials to access the wireless access point or network identified in the request;

the access rights server configured to maintain a list of wireless access points or networks and an associated list of users or devices that have rights to distribute credentials for accessing one or more of the access points or networks; and the access rights server further configured to generate and to transmit back to the first device in response to the request, accessing information enabling guest wireless devices to obtain access rights for the wireless access point or network identified in the request, from the storage partition in the database associated with the access rights server, if a user of the first device is authorized to share access information for the wireless access point or network identified in the request, the storage partition being accessible with the accessing information.

Example embodiments of the invention include a system comprising:

the guest wireless device further configured to transmit authentication information to the access rights server, to enable the access rights server to authenticate the guest wireless device.

Example embodiments of the invention include a system comprising:

a machine readable medium configured to receive and to store data received from the first device, including the accessing information to enable a guest wireless device that has read the data from the machine readable medium, to obtain from the access rights server, credentials to access the wireless access point or network, based on the accessing information;

a guest wireless device that wishes to access the wireless access point or network, configured to read the data from the machine readable medium, including the accessing information, and further configured to transmit a message to the access rights server, requesting credentials to enable accessing the wireless access point or network, the request including the accessing information;

the access rights server further configured to transmit the credentials to the guest wireless device to enable it to gain access to the wireless access point or network by using the credentials;

the guest wireless device further configured to store a location indication representing a location where the guest wireless device read the data from the machine readable medium; and the guest wireless device further configured to transmit to the access rights server, the location information to confirm that the machine-readable medium was not moved from a location where it was installed.

Example embodiments of the invention include a system comprising:

wherein the machine-readable medium is at least one of a near field communication tag and a two-dimensional bar-coded surface.

Example embodiments of the invention include a system comprising:

wherein the wireless message transmitted by the first device to the access rights server, includes condition information specified by the first device to be stored in the storage partition in the database, which is at least one of a specification of an interval within which the guest device may access the access point and a specification of a location of installation of the machine readable medium.

Example embodiments of the invention include a system comprising:

wherein the access rights server receives a notice from the user of the first wireless device, to revoke the access rights of the guest device and the access rights server transmits a message to the guest device to delete the credentials.

Example embodiments of the invention include a system comprising:

wherein the access rights server receives a notice from the user of the first wireless device, to revoke the access rights of the guest device and the access rights server transmits a message to the access point to change the access rights of the guest device to deny access.

Example embodiments of the invention include a system comprising:

wherein the user of the first device is an owner or manager of the wireless access point or network identified in the request.

The resulting embodiments improve user experience and security in sharing wireless network configurations.

DESCRIPTION OF THE FIGURES

FIG. 1A is an example network diagram of a wireless device A and an access rights server, showing device A transmitting to the access rights server, a wireless message including a request for a URL to address a storage partition in the server that stores credentials to access an access point that is owned or managed by the user of device A, device A further including an NFC reader/writer, a two-dimensional barcode printing application, a Bluetooth transceiver, a WLAN transceiver, and a wide area transceiver, in accordance with example embodiments of the invention.

FIG. 1D shows the example network diagram of FIG. 1C, wherein in a first embodiment, a guest wireless device B that wishes to access the access point AP, reads data from the NFC tag, including the URL expression "URL for AP", the figure further showing a second embodiment wherein the guest wireless device B reads the two-dimensional barcode image representing the URL expression "URL for AP" that has been printed onto a surface, in accordance with example embodiments of the invention.

FIG. 1E shows the example network diagram of FIG. 1D, wherein the guest wireless device B transmits a message requesting access credentials to enable accessing the access point AP, the request including URL expression "URL for AP" to indicate the identity of the requester as device B, the access rights server establishing the URL expression "URL for AP" as an address for the storage partition in the database where the credentials are stored for the guest device B, in accordance with example embodiments of the invention.

FIG. 1F shows the example network diagram of FIG. 1E, wherein the access rights server transmits the credentials "Password(B)" to guest wireless device B and also transmits these credentials via the infrastructure network to the access point AP, the figure also showing the access point allowing the guest device B to gain access by using the credentials, in accordance with example embodiments of the invention.

FIG. 1G shows the example network diagram of FIG. 1F, wherein the access rights server receives a notice from owner/manager device A to revoke the access rights of guest device B, the figure showing the access rights server transmitting a message to guest device B to delete the password, the figure also showing optionally transmitting a revocation notice via the infrastructure network to the access point AP, thereby changing the access rights of device B without altering the URL expression "URL for AP" in the NFC tag or the two-dimensional barcode, in accordance with example embodiments of the invention.

FIG. 4A is an example flow diagram of the process performed by the owner/manager device A, in accordance with example embodiments of the invention.

FIG. 4B is an example flow diagram of the process performed by the guest device, in accordance with example embodiments of the invention.

FIG. 4C is an example flow diagram of operational steps of an example embodiment of the method carried out the wireless device A, according to an embodiment of the present invention.

FIG. 4D is an example flow diagram of operational steps of an example embodiment of the method carried out the wireless device B, according to an embodiment of the present invention.

DISCUSSION OF EXAMPLE EMBODIMENTS OF THE INVENTION

Figure 1B:
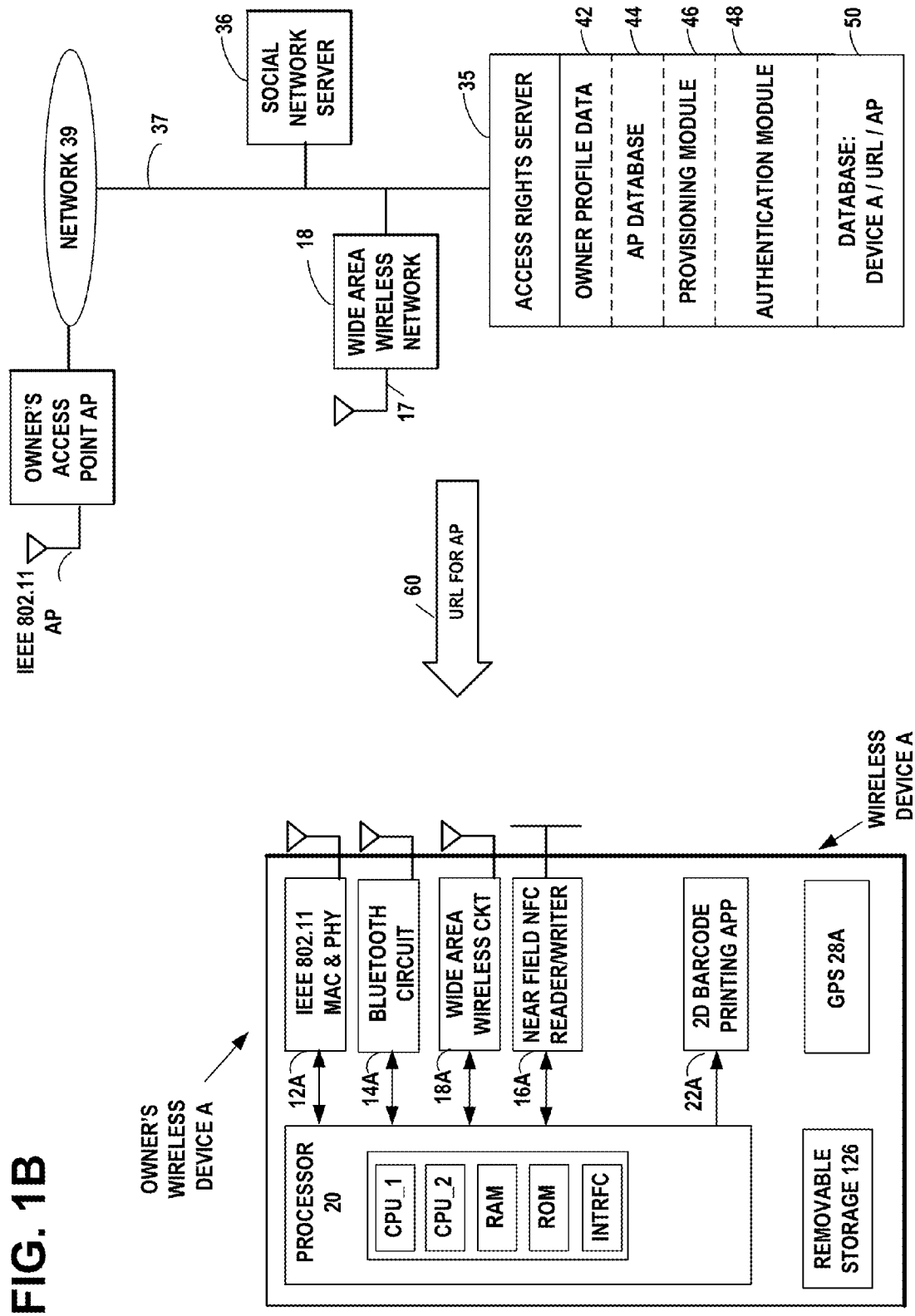
FIG. 1B shows the example network diagram of FIG. 1A, wherein owner/manager wireless device A receives a responsive wireless message from the access rights server, including a URL expression "URL for AP" enabling guest devices to obtain access rights for the access point AP, the access rights server establishing a storage partition in a database corresponding to the URL expression "URL for AP", in accordance with example embodiments of the invention.

This section is organized into the following topics:
A. Wireless Short-Range Communication Networks
B. Connection Formation Between Bluetooth™ Devices
C. WLAN Communication Technology
   1, IEEE 802.11 WLAN
   2. Wi-Fi Protected Setup/Wi-Fi Simple Configuration (WSC)
   3. Authentication in Wi-Fi Protected Setup/Wi-Fi Simple Configuration
   4. Wi-Fi Direct—Software Access Points
D. Near-Field Communication (NFC) Technology
E. Sharing Wireless Network Configurations A. Wireless Short-Range Communication Networks Short-range communication technologies provide communication solutions appropriate for many data applications, without the cost, traffic and legislative concerns of longer-range communication technologies. Short-range communication technologies include Bluetooth basic rate/enhanced data rate (BR/EDR), Bluetooth Low Energy (LE), IEEE 802.11 wireless local area network (WLAN), Wireless Universal Serial Bus (WUSB), ZigBee (IEEE 802.15.4, IEEE 802.15.4a), and near field communication technologies, such as radio frequency identification (RFID) and near field communication (NFC) technology that enable contactless identification and interconnection of wireless devices.

B. Connection Formation Between Bluetooth™ Devices

A procedure for forming connections between Bluetooth™ devices is described in the Bluetooth™ Specification, Version 4, Jun. 30, 2010. The Bluetooth™ Baseband is the part of the Bluetooth™ system that implements the Media Access Control (MAC) and physical layer procedures to support the connection formation, exchange of data information streams, and ad hoc networking between Bluetooth™ devices. Connection formation includes inquiry, inquiry scanning, inquiry response, paging, page scanning, and page response procedures.

1, Inquiry

Inquiry is a procedure where a Bluetooth™ device transmits inquiry messages and listens for responses in order to discover the other Bluetooth™ devices that are within the coverage area. Bluetooth™ devices use the inquiry procedure to discover nearby devices, or to be discovered by devices in their locality. A Bluetooth™ device that tries to find other nearby devices is known as an inquiring device and actively sends inquiry requests. Bluetooth™ devices that are available to be found are known as discoverable devices, listen or scan for these inquiry requests, and send responses. The inquiry procedure uses dedicated physical channels for the inquiry requests and responses. The inquiry procedure does not make use of any of the architectural layers above the physical channel, although a transient physical link may be considered to be present during the exchange of inquiry and inquiry response information.

Bluetooth™ devices communicate with one another over a total bandwidth of 80 MHz divided into 79 physical channels of 1 MHz each. An inquiring device wanting to discover other devices repetitively probes a first set of 16 frequencies, probing two frequencies every 625 microseconds. It repeats this at least 256 times. Then, it repetitively probes a second set of 16 frequencies. The inquiring device will repeat entire cycle at least two times. Of the 79 radio carriers, 32 are considered wake-up carriers and the inquiring device Broadcasts inquiry packets on these 32 carrier frequencies.

During the inquiry procedure, the master transmits inquiry messages with the general or dedicated inquiry access code. The timing for inquiry is the same as for paging. The identity or ID packet consists of the inquiry access code (IAC). It has a fixed length of 68 bits. The receiver uses a bit correlator to match the received packet to the known bit sequence of the ID packet. In order to discover other devices a device may enter inquiry substate. In this substate, it may repeatedly transmit the inquiry message (ID packet) at different hop frequencies. The inquiry hop sequence is derived from the Lower Address Part (LAP) of the General Inquiry Access Code (GIAC). Thus, even when dedicated inquiry access codes (DIACs) are used, the applied hopping sequence is generated from the GIAC LAP. A device that allows itself to be discovered, may regularly enter the inquiry scan substate to respond to inquiry messages. The inquiry response is optional: a device is not forced to respond to an inquiry message. During the inquiry substate, the discovering device collects the Bluetooth™ device Addresses and clocks of all devices that respond to the inquiry message. In addition, the discovering device also collects extended information (e.g. local name and supported services) from devices that respond with an extended inquiry response packet. It may then, if desired, make a connection to any one of the discovered devices by means of the page procedure described below. The inquiry message broadcast by the source does not contain any information about the source. However, it may indicate which class of devices should respond. There is one general inquiry access code (GIAC) to inquire for any device, and a number of dedicated inquiry access codes (DIAC) that only inquire for a certain type of device. The inquiry access codes are derived from reserved Bluetooth™ device addresses. There is only one DIAC defined in the Bluetooth™ Specification, and it is called the Limited Inquiry Access Code (LIAC). The LIAC is only intended to be used for limited time periods in scenarios where both devices have been explicitly caused to enter this state, usually by user action.

Inquiry scan is a procedure where a Bluetooth™ device listens for inquiry messages received on its inquiry scan physical channel. A device using one of its inquiry scan channels remains passive on that channel until it receives an inquiry message on this channel from another Bluetooth™ device. This is identified by the appropriate inquiry access code. The inquiry scanning device will then follow the inquiry response procedure to return a response to the inquiring device. The inquiry scan substate is very similar to the page scan substate. However, instead of scanning for the device's device Access code, the receiver may scan for the inquiry access code long enough to completely scan for 16 inquiry frequencies. The inquiry procedure uses 32 dedicated inquiry hop frequencies according to the inquiry hopping sequence. These frequencies are determined by the general inquiry address. The phase is determined by the native clock of the device carrying out the inquiry scan. Instead of, or in addition to, the general inquiry access code, the device may scan for one or more dedicated inquiry access codes. However, the scanning may follow the inquiry scan hopping sequence determined by the general inquiry address. The inquiry scan interval may be less than or equal to 2.56 s.

2. Inquiry Response

An inquiry response packet (FHS) is transmitted from the slave to the master after the slave has received an inquiry message. This packet contains information necessary for the inquiring master to page the slave and follows 625 microseconds after the receipt of the inquiry message. The inquiry response packet is received by the master at the hop frequency when the inquiry message received by the slave was first in the master-to-slave slot. The slave response substate for inquiries differs completely from the slave response substate applied for pages. When the inquiry message is received in the inquiry scan substate, the recipient may return an inquiry response (FHS) packet containing the recipient's device Address (BD_ADDR) and other parameters. If the recipient has non-zero extended inquiry response data to send, it may return an extended inquiry response packet after the FHS packet. On the first inquiry message received in the inquiry scan substate the slave may enter the inquiry response substate. If the slave has non-zero extended inquiry response data to send it may return an FHS packet, with the extended inquiry response bit set to one, to the master 625 microseconds after the inquiry message was received. It may then return an extended inquiry response packet 1250 microseconds after the start of the FHS packet. If the slave's extended inquiry response data is all zeroes the slave may only return an FHS packet with the extended inquiry response bit set to zero.

A contention problem could arise when several devices are in close proximity to the inquiring device or master and all respond to an inquiry message at the same time. However, because every device has a free running clock it is highly unlikely that they all use the same phase of the inquiry hopping sequence. In order to avoid repeated collisions between devices that wake up in the same inquiry hop channel simultaneously, a device will back-off for a random period of time. Thus, if the device receives an inquiry message and returns an FHS packet, it will generate a random number, RAND, between 0 and MAX_RAND. For scanning intervals greater than or equal to 1.28 seconds MAX_RAND will be 1023, however, for scanning intervals less than 1.28s MAX_RAND may be as small as 127. A profile that uses a DIAC may choose to use a smaller MAX_RAND than 1023 even when the scanning interval is greater than or equal to 1.28s. The slave will return to the CONNECTION or STANDBY state for the duration of at least RAND time slots. Before returning to the CONNECTION and STANDBY state, the device may go through the page scan substate. After at least RAND slots, the device will add an offset of 1 to the phase in the inquiry hop sequence (the phase has a 1.28 second resolution) and return to the inquiry scan substate again. If the slave is triggered again, it will repeat the procedure using a new RAND. The offset to the clock accumulates each time an FHS packet is returned. During a period when the inquiry device is broadcasting inquiry packets, a slave may respond multiple times, but on different frequencies and at different times. Reserved synchronous slots should have priority over response packets; that is, if a response packet overlaps with a reserved synchronous slot, it will not be sent, but the next inquiry message is awaited. If a device has extended inquiry response data to send, but the extended inquiry response packet overlaps with a reserved synchronous slot, the FHS packet may be sent with the EIR bit set to zero.

The messaging during the inquiry routines is summarized as follows:

In step 1, the master transmits an inquiry message using the inquiry access code and its own clock.

In step 2, the slave responds with the FHS packet containing the slave's Bluetooth™ device Address, native clock and other slave information. This FHS packet is returned at times that tend to be random. The FHS packet is not acknowledged in the inquiry routine, but it is retransmitted at other times and frequencies as long as the master is probing with inquiry messages.

In step 3, if the slave has non-zero extended inquiry response data, it sends an extended inquiry response packet to the master.

3. Extended Inquiry Response

An Extended Inquiry Response may be used to provide miscellaneous information during the inquiry response procedure. Data types are defined for such things as local name and supported services, information that otherwise would have to be obtained by establishing a connection. A device that receives a local name and a list of supported services in an extended inquiry response does not have to connect to do a remote name request and a service discovery protocol (SDP) service search, thereby shortening the time to useful information. If the slave transmits an extended inquiry response packet, it is transmitted 1250 microseconds after the start of the inquiry response packet. The extended inquiry response packet is received by the master at the hop frequency when the inquiry message received by the slave was first in the master-to-slave slot. The extended inquiry response packet is an Asynchronous Connection-oriented Logical transport (ACL) data medium rate (DM) packet with type DM1, DM3, DM5, DH1, DH3 or DH5. To minimize interference it is recommended to use the shortest packet that is capable of containing the data. The packet is sent on the same frequency as the (frequency hop synchronization) FHS packet, 1250 microseconds after the start of the FHS packet. In the packet header, the logical transport address (LT_ADDR) may be set to zero. TYPE may be one of DM1, DM3, DM5, DH1, DH3 or DH5. FLOW, ARQN and SEQN may all be set to zero and ignored during receipt. (ARQN is automatic repeat address acknowledgement indication and SEQN is sequential numbering scheme.) The header error check (HEC) linear feedback shift register (LFSR) may be initialized with the same default check initialization (DCI) as for the FHS packet. In the payload header, logical link identifier (LLID) may contain the value 10 (start of a logical link control and adaptation control (L2CAP) message or no fragmentation). FLOW may be set to zero and ignored upon receipt. The length of the payload body (LENGTH) may be smaller than or equal to 240 bytes. The cyclic redundancy check (CRC) linear feedback shift register (LFSR) may be initialized with the same DCI as for the FHS packet. The data whitening LFSR may be initialized with the same value as for the FHS packet. The length of the payload body (LENGTH) may be smaller than or equal to 240 bytes. The CRC LFSR may be initialized with the same DCI as for the FHS packet. The data whitening LFSR may be initialized with the same value as for the FHS packet. The payload data has two parts, a significant part followed by a non-significant part. The significant part contains a sequence of data structures. The non-significant part contains all zero octets. The baseband may not change any octets in the significant part. When transmitting data, the non-significant part octets may be omitted from the payload. A device may store a single extended inquiry response packet. This packet may be used with all inquiry access codes (IACs).

4. Page

Page is the initial phase of the connection procedure where a device transmits a train of page messages until a response is received from the target device or a timeout occurs. Page scan is a procedure where a device listens for page messages received on its page scan physical channel. In forming a connection, the paging device will become the master and the page scan device will become the slave in a piconet. Initially, after the slave has received an inquiry message, an inquiry response packet is transmitted from the slave to the master. The inquiry response packet sent from the inquiring master contains information necessary for the inquiring master to page the slave, such as Bluetooth™ device Address and the clock of the slave device. In the paging procedure, the Bluetooth™ device that will become the master carries out a page procedure by transmitting page messages in connection request packets to the specified Bluetooth™ slave device that carries out a page scanning procedure to listen for connection request packets from the paging device. A connectable Bluetooth™ device listens for a page request on its page scan channel and, once received, enters into a sequence of exchanges with the paging device. In order for a device to connect to another device, it performs frequency hopping all page scan channel frequencies, sending a page request on each frequency and listening for a response. The page scan channel uses an access code derived from the scanning device's Bluetooth™ device Address BD_ADDR to identify communications on the channel. The page scan channel uses a slower hopping rate than the hop rate of the paging device, using the Bluetooth™ device clock of the scanning device as an input. A device listening on its page scan channel remains passive until it receives a page request from another Bluetooth™ device, identified by the page scan channel access code. The two devices will then follow the page procedure to form a connection where the paging device is the master and the page scan device is the slave in a piconet. In order for a paging device to connect to another Bluetooth™ device, it uses the page scan channel of the target device in order to send page requests. If the paging device does not know the phase of the target device's page scan channel, it does not know the current hop frequency of the target device. Therefore, the paging device transmits page requests on each of the page scan hop frequencies and listens for a page response. This is done at a faster hop rate, allowing the paging device to cover all page scan frequencies in a short period of time. The paging device may have some knowledge of the target device's Bluetooth™ clock, such as indicated during a previous inquiry transaction between the two devices, and may be able to predict the phase of the target device's page scan channel. It may use this information to optimize the synchronization of the paging and page scanning process and speed up the formation of the connection.

5. Service Discovery Protocol (SDP)

Bluetooth devices are designed to find other Bluetooth devices within their radio communications range and to discover what services they offer, using a service discovery protocol (SDP). The SDP searching function relies on links being established between the requesting Bluetooth device in a client role and the responding Bluetooth device in a server role. Once a link has been established, it can be used to find out about services in the responding Bluetooth device and how to connect to them.

Service Discovery Protocol (SDP) is used to allow devices to discover what services each other support, and what parameters to use to connect to them. For example, when connecting a mobile phone to a Bluetooth headset, SDP will be used to determine which Bluetooth profiles are supported by the headset (headset profile, hands free profile, advanced audio distribution profile, etc.) and the protocol multiplexor settings needed to connect to each of them. Each service is identified by a Universally Unique Identifier (UUID), with official services (Bluetooth profiles) assigned a short form UUID (16 bits rather than the full 128).

C. WLAN Communication Technology

1. IEEE 802.11 WLAN

The IEEE 802.11 standard specifies methods and techniques of an exemplary wireless local area network (WLAN) operation. examples include the IEEE 802.11b and 802.11g wireless local area network specifications, which have been a staple technology for traditional WLAN applications in the 2.4 GHz ISM band. The various amendments to the IEEE 802.11 standard were consolidated for IEEE 802.11a, b, d, e, g, h, i, j, k, n, r, s, u, v, and z protocols, into the base standard

*IEEE 802.11-2012, Wireless Medium Access Control (MAC) and Physical Layer (PHY) Specifications*, February 2012 (incorporated herein by reference). Since then, emerging broadband applications have stimulated interest in developing very high-speed wireless networks for short range communication, for example, the planned IEEE 802.11ac, and the planned IEEE 802.11ad WLAN specifications that are to provide a very high throughput in higher frequency bands. Applications of these IEEE 802.11 standards include products such as consumer electronics, telephones, personal computers, and access points for both for home and office.

An IEEE 802.11 WLAN may be organized as an independent basic service set (IBSS) or an infrastructure basic service set (BSS). The access point (AP) in an infrastructure basic service set (BSS) IEEE 802.11 WLAN network, is a central hub that must relay all communication between the mobile wireless devices (STAs) in an infrastructure BSS. If a STA in an infrastructure BSS wishes to communicate a frame of data to a second STA, the communication must take two hops. First, the originating STA transfers the frame to the AP. Second, the AP transfers the frame to the second STA. In an infrastructure BSS, the AP either transmits Beacons or responds to probes received from STAs. After a possible authentication of a STA that is conducted by the AP, an association occurs between the AP and a STA enabling data traffic to be exchanged with the AP. The Access Point (AP) in an Infrastructure BSS may bridge traffic out of the BSS onto a distribution network. STAs that are members of the BSS exchange packets only with the AP.

The IEEE 802.11 WLAN uses two types of transmission: Distributed Coordination Function (DCF) and Point Coordination Function (PCF). DCF employs Carrier Sense Multiple Access with Collision Avoidance (CSMA/CA). Every packet sent is positively acknowledged by the receiver. A transmission begins with a Request to Send (RTS) and the receiver responds with a Clear to Send (CTS). The channel is cleared by these two messages, since all STAs that hear the CTS will suppress their own start of a transmission. Then when data packets are transmitted, each has a Network Allocation Vector (NAV) containing a duration value to reserve the channel for the sender and receiver for an interval after the current packet, equal to the NAV duration. The value of the NAV decrements with the passage of time. Once the sender and receiver have reserved the channel, they may hold it for the remaining duration of the NAV value. The last acknowledgement packet (ACK) contains a NAV value of zero, to immediately release the channel. The Point Coordination Function (PCF) is a polling method among the STAs of the BSS, which is coordinated by the access point.

IEEE 802.11 authentication operates at the link level between IEEE 802.11 STAs. IEEE Std 802.11 attempts to control LAN access via the authentication service. IEEE 802.11 authentication is a station service that may be used by all STAs to establish their identity to STAs with which they communicate in both infrastructure and IBSS networks. If a mutually acceptable level of authentication has not been established between two STAs, then an association is not established. IEEE 802.11 defines two authentication methods: Open System authentication and Shared Key authentication. Open System authentication admits any STA to the distribution system. Shared Key authentication relies on wired equivalent privacy to demonstrate knowledge of an encryption key. The IEEE 802.11 authentication mechanism also allows definition of new authentication methods. A robust security network association (RSNA) supports authentication based on IEEE 802.1X-2004, or preshared keys (PSKs). IEEE 802.1X authentication utilizes the Extensible Authentication Protocol (EAP) (IETF RFC 3748-2004) to authenticate STAs and an authentication server (AS) with one another. In IEEE 802.1X, a STA being authenticated and the authenticator device exchange protocol information via the IEEE 802.1X Uncontrolled Port. The IEEE 802.1X Controlled Port is blocked from passing general data traffic between two STAs until an IEEE 802.1X authentication procedure completes successfully over the IEEE 802.1X Uncontrolled Port.

2. Wi-Fi Protected Setup/Wi-Fi Simple Configuration (WSC)

Network setup for IEEE 801.11 WLANs has been simplified by the Wi-Fi Protected Setup™ system that is included in most access points. The Wi-Fi Alliance published the Wi-Fi Protected Setup (WPS) specification 1.0, *Wi-Fi Protected Setup Specification, Version 1.0h*, December 2006 (incorporated herein by reference). *The Wi-Fi Simple Configuration (WSC) Specification*, Version 2.0, Dec. 20, 2010, (incorporated herein by reference), updates the *Wi-Fi Protected Setup Specification*, Version 1.0h. The acronym WSC, for *Wi-Fi Simple Configuration Specification*, may be used interchangeably with the acronym WPS, for Wi-Fi Protected Setup. Wi-Fi Protected Setup facilitates the initial setting up of IEEE 802.11 devices in a Wi-Fi infrastructure network so that they may be more easily configured with security features and so that that new Wi-Fi devices may be added to the network. Wi-Fi Protected Setup allows access points to be set up by entering a PIN. The Protected Setup system uses this information to send data to a computer connected to the access point, to complete the network setup. Wi-Fi Protected Setup defines new IEEE 802.11 information elements (IE) that are included in beacons, probe requests and probe responses. The purpose of these IEs is to advertise the presence of devices that are capable of performing Wi-Fi Protected Setup operations.

Initial discovery of Wi-Fi Simple Configuration devices is accomplished using IEEE 802.11 Information Elements in management frames (Beacon, Probe Request, and Probe Response). If the Enrollee decides to pursue a connection to the network, it initiates an IEEE 802.1X/EAP connection for the Extensible Authentication Protocol (EAP)-based Registration Protocol. The Wi-Fi Simple Configuration Information Element complies with the IEEE 802.11 Information Element format and indicates specific data necessary for network information, capabilities and modes, to configure an Enrollee for the wireless network and to report problems with the Enrollee associating with a specified wireless network with the supplied settings.

The Wi-Fi Protected Setup 1.0 standard defines three types of components in a network: a Registrar, an Enrollee, and an Access Point (AP). A Registrar is a component with the authority to issue and revoke credentials to a network. A Registrar may be integrated into an AP or it may be separate from the AP. An Enrollee is a component seeking to join a wireless LAN network. An Authenticator is an AP functioning as a proxy between a Registrar and an Enrollee. A Registrar wireless device configures the Enrollee wireless device, and the AP acts as an Authenticator to proxy the relevant messages between the Registrar and the Enrollee. The messages exchanged in the session are a series of Extensible Authentication Protocol (EAP) request/response messages, ending with the Enrollee reconnecting to the network with its new configuration. EAP is an authentication framework defined in RFC 5247, for providing the transport and usage of keying material and parameters needed to establish a secure Wi-Fi network. *The Wi-Fi Simple Configuration Specifica-*

*tion*, Version 2.0, Dec. 20, 2010, (incorporated herein by reference), updates the *Wi-Fi Protected Setup Specification*, Version 1.0h.

A standalone AP that supports Wi-Fi Protected Setup, includes a built-in Registrar and does not use an external Registrar. In initial WLAN setup with Wi-Fi Protected Setup, when initializing in a standalone mode, a Wi-Fi Protected Setup AP automatically chooses a random SSID and channel. A standalone AP that includes a Wi-Fi Protected Setup Registrar, issues keys to Enrollees via the Registration Protocol.

When an Enrollee is initialized, it looks for Beacons from APs and sends probe requests with the WSC information element (IE), into either selected networks or into each network sequentially. It may also send probe requests to each IEEE 802.11 channel with the WSC IE included. It looks for the WSC IE in probe-responses that it receives and can engage with one or more Registrars to further discover Registrar capabilities and to see if the user has selected a Registrar. The Enrollee may continue looking for selected Registrar flags in Beacons, probe-responses and any M2 messages and may cease scanning when it finds a Registrar indicating that it is prepared to configure the Enrollee.

The following example describes an example in-band setup procedure using Wi-Fi Protected Setup for adding Member devices using a Standalone AP/Registrar. The user may convey the Enrollee's device password to the AP/Registrar using keyboard entry or an out-of-band channel with Near-Field Communication (NFC) Connection Handover. This example does not show the exchange of preliminary M1 and M2D messages that may take place after the probe message exchange, because the Enrollee may be waiting for the user to configure the AP/Registrar with the Enrollee's device password.

1. The Enrollee sends its Discovery data in a probe request to a Wi-Fi Protected Setup AP or ad hoc wireless Registrar. The AP or wireless Registrar responds with its own Discovery data in the probe response.

2. The user may be prompted to enter the Enrollee's device password into the AP/Registrar using a keypad interface or an out-of-band channel.

3. The Enrollee connects and initiates the IEEE 802.1x port-based Network Access Control procedure for port-based authentication.

4. The Enrollee and Registrar exchange messages M1-M8 to provision the Enrollee.

5. The Enrollee disassociates and reconnects, using its new WLAN authentication Credential. The Enrollee is now connected to the network with its new configuration.

3. Authentication in Wi-Fi Protected Setup/Wi-Fi Simple Configuration

The *Wi-Fi Simple Configuration Specification*, Version 2.0 (renamed from the original name "Wi-Fi Protected Setup"), uses the IEEE 802.1X Port-Based Authentication and Extensible Authentication Protocol (EAP) to transport in-band Registration Protocol messages. This protocol is mapped onto a custom EAP method described below. Wi-Fi Simple Configuration does not require the AP to support remote authentication dial-in user service (RADIUS) (IETF RFC 2865-2000), and the network need not include an authentication server. In fact, many Wi-Fi Simple Configuration APs may support IEEE 802.1X only to configure Wi-Fi Protected Access 2 (WPA2)-Personal Credentials using Wi-Fi Simple Configuration. Enrollees using Wi-Fi Simple Configuration are not granted direct access to the WLAN through the Wi-Fi Simple Configuration custom EAP method. The EAP method is used to configure the Enrollee with a Credential that can be used subsequently with whatever access method is supported by that WLAN. For example, if the AP only supports WPA2-Personal with a network-wide shared Pre-Shared Key (PSK), then the Enrollee would run the 802.1X exchange to obtain the PSK, disassociate, and then reconnect and use WPA2-Personal to access the WLAN. Alternatively, if the AP supports 802.1X authentication, the Enrollee may first run the Wi-Fi Simple Configuration EAP method to obtain a shared secret Credential and then reconnect using that secret in conjunction with another EAP method to access the WLAN.

The Wi-Fi Simple Configuration EAP method (EAP-WSC) can be used for Registrar and Enrollee discovery and for Credential establishment. The first time the Enrollee encounters a new WLAN, it sends out its Discovery information and executes the EAP-WSC method. In both the Discovery message and in Registration Protocol Message M1, the Enrollee provides information about itself to the WLAN. The M2 and M2D messages sent to the Enrollee likewise provide information about the available Registrars. When the Enrollee first discovers and attempts to connect to the WLAN, the WLAN's Registrar(s) may not yet know the Enrollee's device password. Therefore, Registrars without the device password respond with M2D messages. Although these M2D messages are unauthenticated, they can help Enrollees with rich user interfaces, to guide the user through the enrollment process.

As the Enrollee scans over the M2D messages sent by the network, it may discover that none of them possesses its device password. At this point, the Enrollee has an opportunity to prompt the user to perform a trust bootstrapping operation such as connecting an available out-of-band channel or entering a device password into one of the available Registrars. If the user decides to enter the Enrollee's device password into the Registrar, the Enrollee can reconnect and run the EAP method once more to perform the complete Registration Protocol. If the Enrollee has no user interface to lead the user through the enrollment, it is likely that one or more of the WLAN's Registrars can do this. Both the Registrar and the Enrollee are given sufficient information about each others' capabilities through the EAP method to successfully lead the user through the enrollment. If the user decides to use an out-of-band channel for registration, then message M2 is implicitly authenticated by the channel and can carry the network configuration data.

The AP functions as the EAP authenticator on the WLAN. Thus, the AP generates EAP Request messages and Enrollees and Registrars generate EAP Responses. If the Registrar is external to the AP, then it uses universal plug and play (UPnP) to exchange Registration Protocol messages with the AP. A Registrar may also function in the role of an 802.1X authenticator, which is useful for networks with legacy APs.

The Wi-Fi Simple Configuration EAP method uses EAP, as specified in RFC 3748, and Extensible Authentication Protocol (EAP) over LAN (EAPoL), as specified in IEEE 802.1X-2001, but does not represent a network authentication protocol. Rather Wi-Fi Simple Configuration utilizes the 802.1X data connection for acquiring settings necessary for connecting to the network and the resulting EAP exchange must always terminate with EAP-Failure.

When the Enrollee decides to connect to the network and run the Wi-Fi Simple Configuration EAP method, it associates with the AP and sends an EAPoL-Start message. The AP responds with an EAP-Request/Identity. The Enrollee sends an EAP-Response/Identity containing the defined Wi-Fi Alliance name for a Simple Configuration Enrollee ("WFA-SimpleConfig-Enrollee-1-0"). This causes the AP to start running the Simple Configuration EAP method. The Registration Protocol messages are exchanged until M8 is received and validated by the Enrollee. If it successfully processes M8, the Enrollee sends an EAP-Response/Done message to the authenticator, which sends the WSC_Done message to any External Registrar and the authenticator returns an EAP-Failure message to the Enrollee. An Enrollee should assume that the received credentials are valid after successfully processing message M8 and sending the WSC_Done message. The Enrollee then disassociates and reconnects with the Credential obtained from M8's ConfigData. If M2D is received by the Enrollee, it should respond with an ACK message so that the AP can continue to send it discovery messages from other Registrars. After the AP sends an EAP-failure to the Enrollee, the Enrollee can do one of two things (given that the AP did not de-authenticate the Enrollee after sending the EAP-Failure): it can disconnect from the AP and reconnect some time later to rerun the Wi-Fi Simple Configuration EAP method by sending an EAPoL-Start message or it can stay connected to the AP and rerun the Wi-Fi Simple Configuration EAP method by sending another EAPoL-Start message.

Once the Enrollee sends an M3 message, both the Registrar and the Enrollee must proceed in lock-step fashion until either a failure or until success occurs (indicated by the Done response message). If the Enrollee (IEEE 802.1X supplicant) detects any errors in these later phases, it responds by sending a NACK message and transitioning to the termination state to terminate the connection. At this point, the Enrollee computes a fresh device password for use in the next instance of the Registration Protocol. If the same password is reused with multiple instances of the protocol, it will be susceptible to active attack.

The Registration Protocol Messages M1 to M8 are described in the Wi-Fi Simple Configuration Specification, Version 2.0. They include an exchange of public keys, description of the sending device, including its MAC address and device capabilities, and various message authentication values, culminating in the Registrar sending to the Enrollee credentials for accessing the network.

A credential is a data structure issued by a Registrar to an Enrollee, allowing the latter to gain access to the network. With out-of-band configuration, WLAN credentials are sent across the out-of-band channel to the Enrollee. The NFC interfaces operating in peer-to-peer mode between an AP or Group Owner (GO) having an integrated Registrar and an Enrollee device, have the strongest security properties supported by the Wi-Fi Simple Configuration Specification, because practical man-in-the-middle attacks against NFC are not feasible. In this mode, a 1536-bit Diffie-Hellman exchange is performed over the NFC interface, and WLAN settings are encrypted using 128-bit Advanced Encryption Standard (AES) and delivered over the same interface between an AP or Group Owner (GO) and an Enrollee device. The Diffie-Hellman public keys and WLAN settings are implicitly authenticated by both the Registrar and the Enrollee, because they are received over the NFC channel.

The credential shown in the following Table 1, is a compound attribute issued by an AP or Group Owner (GO) having an integrated Registrar, representing a single WLAN Credential. There can be multiple instances of the credential attribute. The Wi-Fi Simple Configuration Specification provides the following table that lists the attributes in Credential ("R" means required and "O" means optional):

TABLE 1

| Credential | | |
|---|---|---|
| Attribute | R/O | Notes, Allowed Values |
| 1. Network Index | 2. R | 3. Deprecated - use fixed value 1 for backwards compatibility. |
| 4. SSID | 5. R | 6. SSID of network. |
| 7. Authentication Type | 8. R | 9. The authentication type used in this network. |
| 10. Encryption Type | 11. R | 12. The encryption type used in this network. |
| 13. Network Key Index | 14. O | 15. Deprecated. Only included by WSC 1.0 devices. Ignored by WSC 2.0 or newer devices. |
| 16. Network Key | 17. R | 18. |
| 19. MAC Address | 20. R | 21. Member device's MAC address. |
| 22. EAP Type | 23. O | 24. |
| 25. EAP Identity | 26. O | 27. |
| 28. Key Provided Automatically | 29. O | 30. |
| 31. 802.1X Enabled | 32. O | 33. |
| 34. Network Key Shareable (inside WFA Vendor Extension) | 35. O | 36. If present, this attribute indicates whether the Network Key can be shared or not with other devices. |
| 37. <other . . . > | 38. O | 39. Multiple attributes are permitted. |

4. Wi-Fi Direct—Software Access Points

The Wi-Fi Alliance has developed a Wi-Fi Peer-to-Peer technology named Wi-Fi Direct™ that is specified in the *Wi-Fi Alliance Peer-to-Peer Specification*, October 2010 (incorporated herein by reference). Wi-Fi Direct, is also referred to herein as Peer-to-Peer or P2P. Wi-Fi Direct enables IEEE 802.11a, g, or n devices to connect to one another, peer-to-peer, without prior setup or the need for wireless access points. Wi-Fi Direct embeds a software access point into any device, which provides a version of Wi-Fi Protected Setup. When a device enters the range of a STA supporting Wi-Fi Direct (a Wi-Fi Direct device), it can connect to it and then gather setup information using a Wi-Fi Protected Setup transfer. Devices that support Wi-Fi Direct may discover one another and advertise available services. Wi-Fi Direct devices support typical Wi-Fi ranges and the same data rates as can be achieved with an 802.11a, g, or n infrastructure connection. When a device enters the range of the Wi-Fi Direct device, it may connect to it using the existing protocol, and then gather setup information using a Wi-Fi Protected Setup 2.0 transfer.

Wi-Fi Direct enables IEEE 802.11 devices that support Wi-Fi Direct, to connect to one another, point-to-point, without joining a network. The specification may be implemented in any Wi-Fi device. Devices that support the specification will be able to discover one another and advertise available services. Wi-Fi Direct devices will support typical Wi-Fi ranges and the same data rates as can be achieved with an infrastructure connection. Wi-Fi Direct provides point-to-point connections for networks by embedding a software access point into any device that wishes to support Wi-Fi Direct. The soft AP provides a version of Wi-Fi Protected Setup 2.0 by entering a PIN or pressing a button. When a device enters the range of the Wi-Fi Direct device, it may connect to it using the existing protocol, and then gather setup information using a Wi-Fi Protected Setup 2.0 transfer.

Wi-Fi Direct-certified devices may create direct connections between Wi-Fi client devices without requiring the presence of a traditional Wi-Fi infrastructure network of an access point or router. Wi-Fi Direct-certified devices support connection with existing legacy Wi-Fi devices using the IEEE 802.11a/g/n protocols. Wi-Fi Direct Device Discovery and Service Discovery features allow users to identify available devices and services before establishing a connection, for example, discovering which Wi-Fi network has a printer. Wi-Fi Direct devices may use Wi-Fi Protected Setup to create connections between devices.

A Wi-Fi Direct device is capable of a peer-to-peer connection and may support either an infrastructure network of an access point or router or a peer-to-peer (P2P) connection. Wi-Fi Direct devices may join infrastructure networks as stations (STAs) and may support Wi-Fi Protected Setup enrollee functionality. Wi-Fi Direct devices may connect by forming Groups in a one-to-one or one-to-many topology. The Groups functions in a manner similar to an infrastructure basic service set (BSS). A single Wi-Fi Direct device will be the Group Owner (GO) that manages the Group, including controlling which devices are allowed to join and when the Group is started or terminated. The Group Owner (GO) will appear as an access point to legacy client's devices.

Wi-Fi Direct devices include a Wi-Fi Protected Setup Internal Registrar functionality and communication between Clients in the Group. Wi-Fi Direct devices may be a Group Owner (GO) of a Group and may be able to negotiate which device Adopts this role when forming a Group with another Wi-Fi Direct device. A Group may include both Wi-Fi Direct devices and legacy devices (i.e., that are not compliant with the Wi-Fi Alliance Peer-to-Peer Specification). Legacy Devices can only function as Clients within a Group.

Wi-Fi Direct devices may support Discovery mechanisms. Device Discovery is used to identify other Wi-Fi Direct devices and establish a connection by using a scan similar to that used to discover infrastructure access points. If the target is not already part of a Group, a new Group may be formed. If the target is already part of a Group, the searching Wi-Fi Direct device may attempt to join the existing Group. Wi-Fi Protected Setup may be used to obtain credentials from the Group Owner (GO) and authenticate the searching Wi-Fi Direct device. Wi-Fi Direct devices may include Service Discovery that enables the advertisement of services supported by higher layer applications to other Wi-Fi Direct devices. Service Discovery may be performed at any time (e.g. even before a connection is formed) with any other discovered Wi-Fi Direct device.

A Group may be created by a single Wi-Fi Direct device, such as when connecting a legacy device. When forming a connection between two Wi-Fi Direct devices, a Group may be formed automatically and the devices may negotiate to determine which device is the Group Owner. The Group Owner may decide if this is a temporary (single instance) or persistent (multiple, recurring use) Group. After a Group is formed, a Wi-Fi Direct device may invite another Wi-Fi Direct device to join the Group. The decision of whether or not to accept an invitation may be left to the invited Wi-Fi Direct device.

Concurrent Wi-Fi Direct Devices may participate in multiple Groups, simultaneously, each group requires own Wi-Fi stack. A Wi-Fi Direct Device that may be in a Group while maintaining a WLAN infrastructure connection at the same time is considered a Concurrent Device or a dual stack device. For example, a laptop connected directly to a printer while simultaneously using a WLAN connection is operating as a Concurrent Device. Concurrent connections may be supported by a single radio and may support connections on different channels. Concurrent operation may be supported by multiple protocol stacks, for example, one for operation as a WLAN-STA and one for operating as a Wi-Fi Direct device. For example, two separate physical MAC entities may be maintained, each associated with its own PHY entity, or they may use a single PHY entity supporting two virtual MAC entities.

The *Wi-Fi Peer-to-Peer Technical Specification* v1.1, 2010 published by the Wi-Fi Alliance, provides for provisioning in Wi-Fi Direct networks. Provisioning is a phase of peer-to-peer group formation in which credentials for the peer-to-peer group are exchanged based on the use of Wi-Fi Simple Configuration. Credentials are information that is required to join a peer-to-peer group as defined in the Wi-Fi Simple Configuration Specification.

To allow for peer-to-peer device configuration, peer-to-peer devices may delay starting the provisioning phase until the expiration of the larger of the peer-to-peer group owner's (GO) configuration time and the peer-to-peer client's client configuration time, based on respective configuration timeout attributes exchanged during a preceding group owner negotiation.

The peer-to-peer device selected as peer-to-peer group owner (GO) during group owner negotiation may start a peer-to-peer group session using the credentials it intends to use for that group. The peer-to-peer group owner (GO) may use the operating channel indicated during group owner negotiation, if available. The peer-to-peer client may connect to the peer-to-peer group owner to obtain credentials. If the operating channel is not available the peer-to-peer group owner may use another channel from a channel list attribute sent in the group owner negotiation confirmation frame. The peer-to-peer client may have to scan to find the peer-to-peer group owner if the intended operating channel is not available. A group formation bit in a peer-to-peer group capability bitmap of the peer-to-peer capability attribute may be set to one until provisioning succeeds.

Provisioning may be executed in Wi-Fi Direct networks, as described, for example, in the *Wi-Fi Simple Configuration (WSC) Specification*, Version 2.0, Dec. 20, 2010. The peer-to-peer group owner (GO) may serve the role as the access point with an internal registrar. It will only allow association by the peer-to-peer device that it is currently with in a group formation. Since the user has entered the WSC PIN or triggered the WSC pushbutton functionality on both devices, the registrar may send an M2 message in response to an M1 message. The peer-to-peer client may serve the role as the STA enrollee. It may associate to the peer-to-peer device that it is currently with in the group formation.

If provisioning fails, then group formation ends and the peer-to-peer group owner (GO) may end the peer-to-peer group session. If provisioning fails, the peer-to-peer device may retry group formation or return to device discovery. On successful completion of provisioning in Wi-Fi Direct networks, the peer-to-peer group owner (GO) may set the group formation bit in the peer-to-peer group capability bitmap of the peer-to-peer capability attribute to zero. At this point the peer-to-peer client may join the peer-to-peer group in the Wi-Fi Direct network, using the credentials supplied during provisioning.

D. Near-Field Communication (NFC) Technology

One of the methods provided by the *Wi-Fi Simple Configuration Specification*, Version 2.0, is the Near-Field Communication (NFC) method, in which the user brings a new wireless client device (STA) close to an access point (AP) or Registrar of the Network to allow near field communication between the devices.

Near field communication technologies, such as radio frequency identification (RFID) technologies, comprise a range of RF transmission systems, for example standardized and proprietary systems for a large number of different purposes, such as product tagging for inventory handling and logistics, theft prevention purposes at the point of sale, and product recycling at the end of the life-cycle of the tagged product. In addition to RFID technologies, Near Field Communication (NFC) technology has recently evolved from a combination of existing contactless identification and interconnection technologies. NFC is both a "read" and "write" technology. Communication between two NFC-compatible devices occurs when they are brought within close proximity of each other: A simple wave or touch can establish an NFC connection, which is then compatible with other known wireless technologies, such as Bluetooth™ or wireless local area network (WLAN).

Near-field communication (NFC) technology used in the Wi-Fi Protected Setup (WPS) standard, communicates between two NFC Devices or between an NFC device And an NFC Tag via magnetic field induction, where two loop antennas are located within each other's near field, effectively energizing a wireless contact by forming an air-core transformer. An example NFC radio operates within the unlicensed radio frequency ISM band of 13.56 MHz, with a bandwidth of approximately 2 MHz over a typical distance of a few centimeters. The NFC radio may be affixed to a new wireless client device (STA) and the user brings the NFC radio on the device close to an access point (AP) or Registrar of the Network to allow near field communication between the devices.

NFC technology is an extension of the ISO/IEC 14443 proximity-card standard (incorporated herein by reference) for contactless smartcards and radio frequency ID (RFID) devices, which combines the interface of a contactless smartcard and a reader into a single device, and uses the ISO/IEC 18092 NFC communication standard (incorporated herein by reference) to enable two-way communication. An NFC radio may communicate with both existing ISO/IEC 14443 contactless smartcards and readers, as well as with other NFC devices by using ISO/IEC 18092. The NFC Forum™, a non-profit industry association, has released specifications that enable different operation modes called: tag emulation, read/write mode, and peer to peer communication. Furthermore, NFC Forum has defined specifications for NFC Data Exchange Format (NDEF), NFC Tag Types, NFC Record Type Definition, and Connection Handover Specification. See, for example, *Connection Handover Technical Specification*, NFC Forum™, Connection Handover 1.2, NFCForum-TS-ConnectionHandover_1.2, 2010-07-07 (incorporated herein by reference). The ISO/IEC 18092 standard defines communication modes for Near Field Communication Interface and Protocol (NFCIP-1) using inductively coupled devices operating at the center frequency of 13,56 MHz for interconnection of computer peripherals. The ISO/IEC 18092 standard specifies modulation schemes, codings, transfer speeds and frame format of the RF interface, initialization schemes, conditions required for data collision control during initialization, and a transport protocol including protocol activation and data exchange methods.

The basic handover to a WLAN carrier stores WLAN parameters and credentials on NFC Forum Tags as part of Wi-Fi Protected Setup (WPS). The information is stored in the payload of an NFC Data Exchange Format (NDEF) record identified by the mime-type "application/vnd.wfa.wsc", known as the "WPS Record". The wireless LAN parameters and credentials information provided inside a WPS Record includes the IEEE 802.11 Service Set Identifier (SSID), authentication and encryption type deployed by the wireless network, the secret network key that a wireless station needs to authenticate with the network, and the MAC address of the device receiving the configuration (if unknown, this address is set to all-zeros). The Wi-Fi Protected Setup specification 1.0 uses the term "Registrar" for a device that is able to provide WLAN credentials and "Enrollee" for a device that wants to join a wireless network.

In the *Wi-Fi Simple Configuration Specification*, Version 2.0, Dec. 20, 2010, a Handover Requester with Wi-Fi capability may format an NFC Handover Request Message in the NFC Data Exchange Format (NDEF), which indicates that the requester is an IEEE 802.11 device, but which does not include any configuration information. A Handover Request may be sent via the NFC link in at least two scenarios: [1] the requester may not have yet joined a wireless domain or [2] even if the requester is already member of a WLAN network, a peer device may be in a different network and thus a Connection Handover is required to obtain the peer device's credentials. In the Wi-Fi Protected Setup specification 2.0, the Handover Selector would deduce from this message that the Handover Requester supports a Wi-Fi certified IEEE 802.11 radio. In the Wi-Fi Protected Setup specification 2.0, if the Handover Selector is a Wi-Fi device with wireless connectivity, it should respond with an NFC Handover Select Message in the NFC Data Exchange Format (NDEF), with a configuration record that includes credentials, such as network index, SSID, authentication type, encryption type, network key, and MAC address.

The NFC Data Exchange Format (NDEF) specification, *NFC Forum Data Exchange Format (NDEF) Specification*, NFC Forum™, 2006 (incorporated herein by reference), defines a common data format for NFC devices to exchange application or service specific data. An NDEF message is constructed of a number of NDEF records, with the first and the last record providing message begin and end markers. Between two NFC Devices, NDEF messages may be exchanged over the NFC Logical Link Control Protocol (LLCP) protocol, specified in *NFC Forum Logical Link Control Protocol Specification*, NFC Forum™, 2009 (incorporated herein by reference). The NFC Connection Handover specification, *NFC Forum Connection Handover Specification*, NFC Forum™, 2010 Jul., 7 (incorporated herein by reference), defines the exchange of NDEF messages between two NFC Devices in a negotiated handover to discover and negotiate alternative wireless communication technologies.

The Handover Requester in the Wi-Fi Protected Setup specification 2.0, would then typically use the SSID and Network Key to enroll on the same Wi-Fi network to which the Handover Selector is connected. Further actions depend on the provision of an IP address identifying the Handover Selector, the available services, and the Handover Requester's intended activity.

E. Sharing Wireless Network Configurations

The sharing of connectivity configuration parameters between wireless devices in wireless local area networks may be facilitated by providing such parameters in preconfigured machine-readable media such as Radio Frequency Identification (RFID) tags, Near Field Communication (NFC) tags, or two dimensional barcodes, also known as Quick Response (QR) codes. The sharing connectivity configuration parameters, such as a passkey, for accessing a WLAN access point, may be enhanced by enabling the issuing user to retain control over the passkey after it has been shared with other wireless devices.

In an example embodiment of the invention, the user of a wireless device A may also be the owner or manager of a wireless access point of a network and may wish to share the access to the access point with friends and business associates. In order to maintain control over the access rights to the access point that the user of device A may grant, the user may make use of an access sharing platform that combines the storage of user-defined network access credentials in an access rights server, with fixed URL addresses written by the user on machine-readable media that are available to guest devices. By requiring a guest device to contact the access rights server to obtain the network access credentials necessary to access the desired access point, the user may control access to the access point without needing to change the data in the machine-readable media.

The user may impose limitations on access by individual guests, by controlling the connectivity connection parameters stored in the server associated with each guest, such as allowing accesses of the access point only during a specified interval or only from a specified location. In an example embodiment of the invention, intervals may be quite detailed: for example: "access may be granted during Monday from 9 am to 3 pm and Thursday from 11 am to 6 pm and not any other times". In an example embodiment of the invention, access might be restricted to be allowed only when a specific other device is present (such as the owner's device). In this manner, the owner/manager of the access point may modify or revoke the access rights of individual guests without needing to modify the fixed URL addresses written on the machine-readable media.

FIG. 1A is an example network diagram of a wireless device A and an access rights server 35, showing device A transmitting to the access rights server 35, a wireless message 50 including a request for a URL to address a storage partition 50 in the server 35 that stores credentials to access an access point AP that is owned or managed by the user of device A. In accordance with an embodiment of the invention, the message exchange between device A and the access rights server may be via any means, including a wireline connection, for example. Device A further includes an NFC reader/writer 16A, a two-dimensional barcode printing application 22A, a Bluetooth transceiver 14A, a IEEE 802.11 WLAN transceiver 12A, and a wide area transceiver 18A, in accordance with example embodiments of the invention. The wide area transceiver 18A may be based on Wide Area (WAN) communications protocols that include Global System for Mobile Communications (GSM), General Packet Radio service (GPRS), Enhanced data rates for GSM evolution (EDGE), Evolution-Data Optimized (EV-DO), and Wideband Code Division Multiple Access (W-CDMA).

Figure 6:
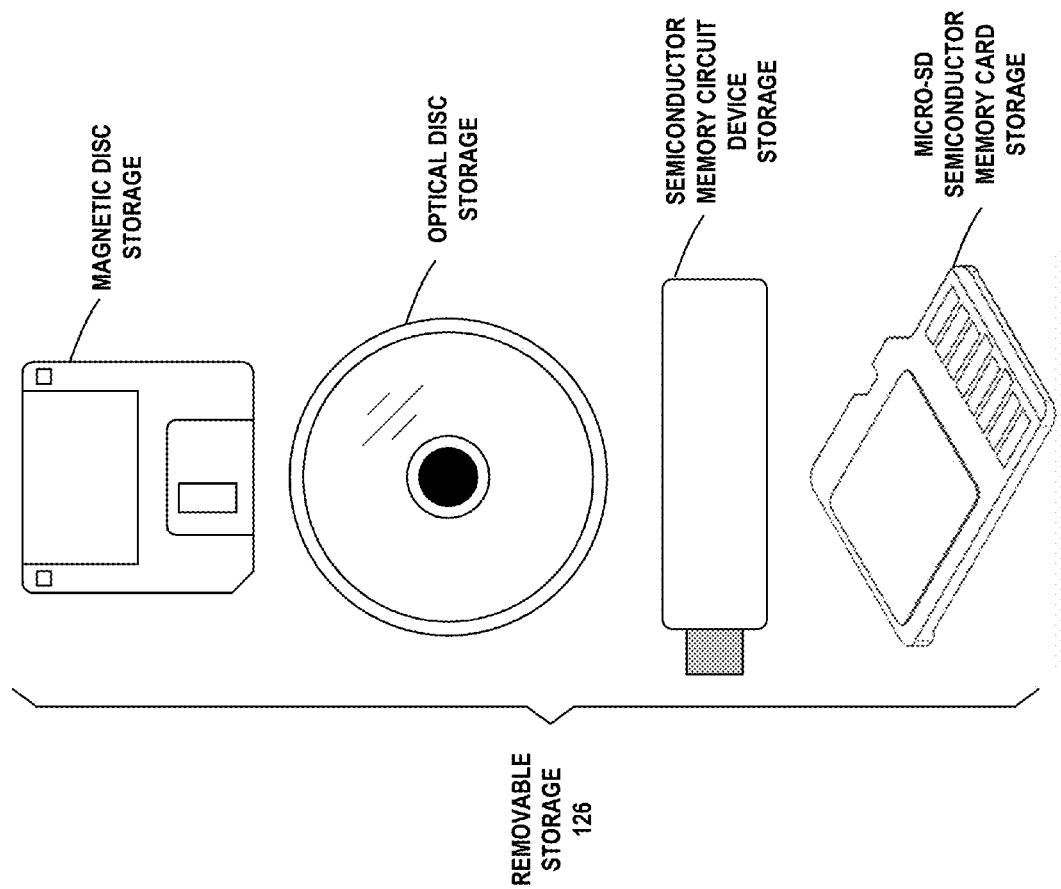
FIG. 6 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In an example embodiment of the invention, device A may be a device having an overall function as a PDA, cell phone, laptop or palmtop computer, or the like. The device A includes a processor 20 that includes a dual core or multi-core central processing unit (CPU_1 and CPU_2), a random access memory (RAM), a read only memory (ROM), and interface circuits to interface with circuits, such as a cell phone radio, a battery and other power sources, key pad, touch screen, display, microphone, speakers, ear pieces, camera or other imaging devices, etc. in the device A. The RAM and ROM may be removable memory devices 126 such as smart cards, SIMs, WIMs, semiconductor memories such as RAM, ROM, PROMS, flash memory devices, etc., as shown in FIG. 6. The IEEE 802.11 MAC and PHY 12A, provide the medium access control and radio for IEEE 802.11 WLAN communications. The device A may include a user interface such as a key pad and a location detection device such as the global positioning system (GPS) 28A. Device A may measure its location by the GPS 28A, by cellular telephone Cell-ID sensed by the wide area wireless transceiver 18A, or by WLAN signals sensed by the IEEE 801.11 transceiver 12A, for example. With reference to FIG. 1D, the device B has similar components to device A in FIG. 1A.

In an example embodiment of the invention, the Wi-Fi Protected Setup programmed instructions may be stored in the memory of device A, device B of FIG. 1D, and access point AP and based on the *Wi-Fi Simple Configuration Specification*, Version 2.0, to enable setting up a device-to-device WLAN network with a second wireless device, using near-field communication signals in the out-of-band device-to-device connection setup. Also included in the memory of device A, device B of FIG. 1D, and access point AP, is the Wi-Fi Direct Peer-to-Peer protocol program, based on the *Wi-Fi Alliance Peer-to-Peer Specification*, for P2P networks. The programmed instructions may be implemented as software, firmware, hardware or any combination thereof.

In an example embodiment of the invention, also included in device A and device B of FIG. 1D are the Wi-Fi Protected Setup (WPS) 2.0 specification programmed instructions for NFC, including the Connection Handover specified for Infrastructure WLAN setup, Password Token (tag) for Infrastructure WLAN setup, and Configuration Token (tag) for Infrastructure WLAN setup. Also included in the memory of device A and device B of FIG. 1D are programmed instructions for the NFC Connection Handover protocol, based on the *NFC Connection Handover Technical Specification*. The programmed instructions may be implemented as software, firmware, hardware or any combination thereof.

In an example embodiment of the invention, access point AP may also be equipped with an out-of-band NFC transceiver and an implementation supporting the Near Field Communication (NFC) protocol.

In an example embodiment of the invention, the IEEE MAC 12A, Wi-Fi Protected Setup Program, Wi-Fi Direct Peer-to-Peer protocol program, and NFC Connection Handover program may be embodied as program logic stored in the RAM and/or ROM in the form of sequences of programmed instructions which, when executed in the CPU, carry out the functions of the disclosed embodiments. The program logic can be delivered to the writeable RAM, PROMS, flash memory devices, etc. of the device A, device B of FIG. 1D, and access point AP from a computer program product or article of manufacture in the form of computer-usable media such as resident memory devices, smart cards or other removable memory devices 126. Alternately, they can be embodied as integrated circuit logic in the form of programmed logic arrays or custom designed application specific integrated circuits (ASIC). The one or more PHY radios in the device A, device B, and access point AP may be separate transceiver circuits or alternately, the one or more radios may be a single RF module capable of handling one or multiple channels in a high speed, time and frequency multiplexed manner in response to the processor 20. device A, device B of FIG. 1D, and access point AP may have the same or similar components.

FIG. 1A further illustrates access rights server 35 connected over a backbone network 37 to the access point device AP, also referred to as control node, and to the network 39, such as a local area network or a wide area network such as the Internet or the public switched telephone network. The control node may be the access point AP or another node for example in an embodiment where the overall network includes several access points. In an example embodiment of the invention, the control node may include some or all of the functional components of the access rights server 35. The access rights server 35 communicates via the backbone network 37 and the wide area wireless network 18 and antenna 17, with the wide area wireless network circuit 18A of the wireless device A. The wide area wireless network 18 and the wide area wireless network circuit 18A may be based on Wide Area (WAN) communications protocols that include Global System for Mobile Communications (GSM), General Packet Radio service (GPRS), Enhanced data rates for GSM evolution (EDGE), Evolution-Data Optimized (EV-DO), and Wideband Code Division Multiple Access (W-CDMA).

In an example alternate embodiment of the invention, the access point device may be a Group Owner device in a peer-to-peer (P2P) network, instead of the access point AP shown in the FIG. 1A, and then the access rights server 35 may be embodied as an integral part of the Group Owner device instead of being connected over the backbone network 37. The access rights server 35 may comprise host profile data 42, an access point AP database 44, a provisioning module 46, an authentication module 48, and a database 50.

In an example embodiment of the invention, the user of the device A may own, host, manage, or administer the access point AP and wireless short-range communication network managed by the access point AP.

The host profile data 42 in the access rights server 35, is information describing the owner/user and/or device and subscription data corresponding to the access point AP or resource for which the user is the host or owner.

The access point AP database 44 in the access rights server 35, stores data for the various access rights, resource information, credential data, and the like associated with accessing the access point AP.

The provisioning module 46 in the access rights server 35, enables the user of device A to select what resources are to be shared with the guest to whom device A will be giving access. The provisioning module enables the device A to establish or define the one or more access rights to be assigned to the guest device B for accessing the access point AP. The provisioning module may receive data from the device A for defining the access rights, the resources involved, and the like. The provisioning module may receive and process input for indicating one or more conditions for enabling access of the access point AP by the guest device B, including proximity based conditions.

The authentication module 48 in the access rights server 35, authenticates users and user devices for interaction with the access rights server 35. The authentication module may receive input for indicating one or more access credentials for the guest device B to access the access point AP that is owned or operated by the user of the device A, including a password or key associated with the access point AP.

The database 50 in the access rights server 35, maintains a list of users, access configurations, user rights, and the sharing of access rights.

In example embodiments of the invention, the access point AP may include some or all of the functional components of the access rights server 35, and may be referred to as a control node.

FIG. 1A further illustrates the social network server 36 connected over the backbone network 37 to the access rights server 35, to the access point device AP, and to the network 39. The access rights server 35 may interact with a social network server 36 for maintaining data regarding one or more users (e.g., contacts) associated with the user of device A. The social network server 36 may be used by the access rights server 35 for cross referencing one or more users requesting access to a resource against the users and resources specified for access by the device A. For example, the social network server 36 may be viewed from the perspective of a social network service such as Facebook or LinkedIn.

The social network server 36 may maintain a listing of various members and/or social networking group affiliations of those members as related to the user of device A. Each member of the social network server 36 may register with the service provider of the social network server 36 by creating a profile for specifying personal details, interests, information sharing restrictions, marketing preferences, etc. In addition, the members are assigned or create a user name, a login password, a security question and the like as access credentials for the social network server 36. As a registered member, the user of device A may communicate with the various other members of the social network server 36 as well, including communication messages and exchanging files.

The social network server 36 may include current friend lists of users who have associated with the user of the device A. The access rights server 35 may determine what access rights are made available to the one or more members of the current friends list. Access rights may be based, for example, on whether a relationship identifier of such a member matches criteria required by the user of the device A, for satisfying the access rights. It is noted that the user of the device A may be an individual person, a group, a company or organization, a website, etc. In an example embodiment of the invention, the users of the device A and the guest device B are socially linked by the social network server 36.

FIG. 1B shows the example network diagram of FIG. 1A, wherein owner/manager wireless device A receives a responsive wireless message 60 from the access rights server 35, including a URL expression "URL for AP" enabling guest devices to obtain access rights for the access point AP, the access rights server establishing a storage partition in the database 50 corresponding to the URL expression "URL for AP", in accordance with example embodiments of the invention.

Figure 1C:
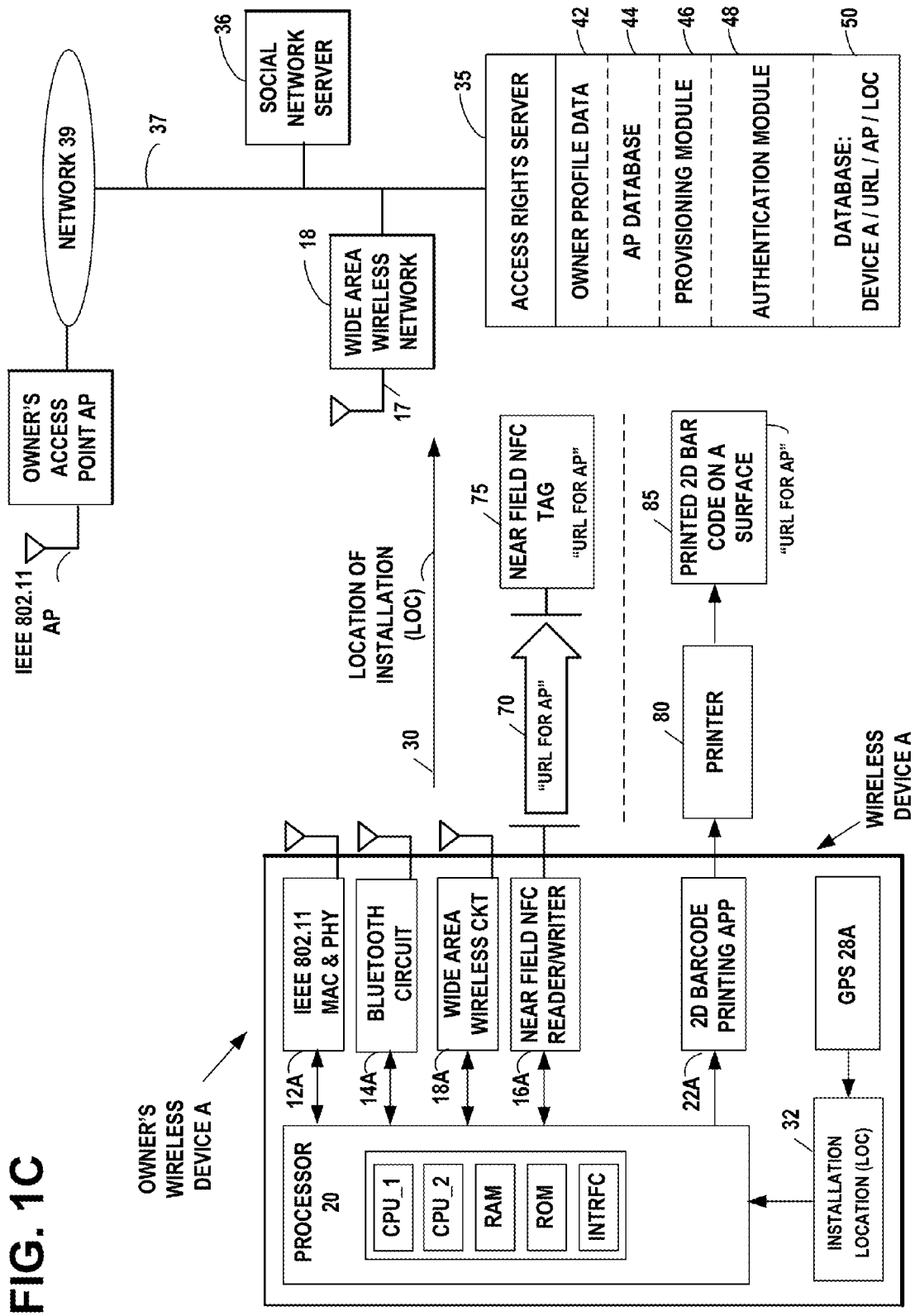
FIG. 1C shows the example network diagram of FIG. 1B, wherein in a first embodiment, owner/manager wireless device A writes data into an NFC tag, including the URL expression "URL for AP", the figure further showing a second embodiment wherein owner/manager wireless device A outputs to a printer, a two-dimensional barcode image representing the URL expression "URL for AP" that is printed onto a surface, in accordance with example embodiments of the invention.

FIG. 1C shows the example network diagram of FIG. 1B, wherein in a first embodiment, owner/manager wireless device A writes data 70 into an NFC tag 75, including the URL expression "URL for AP". FIG. 1C shows a second embodiment wherein owner/manager wireless device A outputs to a printer 80, a two-dimensional barcode image representing the URL expression "URL for AP" that is printed onto a surface 85, such as a door frame, a business card, a key fob, or the like, in accordance with example embodiments of the invention.

In an example embodiment of the invention, when the user brings the two NFC equipped devices A and NFC tag 75 into close proximity, as shown in FIG. 1C, they may establish an NFC communication link based on the NFC Forum Logical Link Control Protocol (LLCP) specification. In this example, it is be the user's intention to have device A write data to the NFC tag 75 including the URL expression "URL for AP". Device A may use the NFC Forum Connection Handover protocol and related NFC protocols, to write the data to the NFC tag 75.

In an example embodiment of the invention, each NFC circuit 16A in device A, 16B in device B of FIG. 1D, and NFC tag 75, communicates bi-directionally with the other NFC circuit via magnetic field induction, where two loop antennas are located within each other's near field, effectively energizing a wireless contact by forming an air-core transformer. An example NFC radio of NFC circuit 16A, 16B of FIG. 1D, or NFC tag 75 operates within the unlicensed radio frequency ISM band of 13.56 MHz, with a bandwidth of approximately 2 MHz over a typical distance of a few centimeters. The NFC circuit 16A or 16B of FIG. 1D, may be affixed to or an integral part of device A or device B, respectively, and the user brings the NFC radio on the device close to the NFC tag 75 to allow near field, bidirectional communication between the radios.

In accordance with an example embodiment of the invention, when the owner/manager wireless device A writes the URL expression "URL for AP" into the NFC tag 75 or prints the two-dimensional barcode image representing the URL expression "URL for AP" with the printer 80 onto the surface 85, the device A is installing the URL expression "URL for AP". The location of the installation, LOC, is measured by the GPS 28A or other location measuring technique and is buffered in the buffer 32 connected to the processor 20 in device A. The device A sends location of the installation, LOC, in a message 30 to the access rights server 35, where it is stored in the database 50.

In accordance with an alternate example embodiment of the invention, the location of the installation, LOC, may be written into the NFC tag 75 or barcode 85 by the wireless device A.

FIG. 1D shows the example network diagram of FIG. 1C, wherein in a first embodiment, a guest wireless device B that wishes to access the access point AP, reads data 72 from the NFC tag 75, including the URL expression "URL for AP". FIG. 1D further shows a second embodiment wherein the guest wireless device B reads with the camera 24A, the two-dimensional barcode image representing the URL expression "URL for AP" that has been printed onto the surface 85, in accordance with example embodiments of the invention.

In accordance with an example embodiment of the invention, when the guest wireless device B reads the URL expression "URL for AP" from the NFC tag 75 or reads the two-dimensional barcode image representing the URL expression "URL for AP" from the surface 85, the location where read, LOC-B, is measured by the GPS 28A or other location measuring technique and is buffered in the buffer 86 connected to the processor 20 in device B.

In accordance with an alternate example embodiment of the invention, the location where read, LOC-B, may be written into the NFC tag 75 or barcode 85 by the wireless device B.

In accordance with an example embodiment of the invention, the URL expression "URL for AP" may be provided to the guest device B via email, SMS, or the like.

FIG. 1E shows the example network diagram of FIG. 1D, wherein the guest wireless device B transmits a wireless message 90 using the wide area wireless circuit 18B, to the access rights server 35, requesting access credentials to enable accessing the access point AP.

In an example embodiment of the invention, authentication information is transmitted by the guest device B in a message 92 to the access rights server 35, to authenticate the identity of the guest device B or its user. The authentication information may be the MAC address of the device B, a password known to the user of device B, a certificate message that carries the sender's public key certificate, or other information authenticating the identity of the guest device B or its user. The authenticating information is passed to the authentication module 48 in the access rights server 35, where the guest device B may be authenticated.

The access rights server 35 establishes the URL expression "URL for AP" as an address for the storage partition in the database 50 where the credentials are stored for the guest device B, in accordance with example embodiments of the invention.

In an example embodiment of the invention, FIG. 1E shows the device B sending the location where read, LOC-B, in a message 88 to the access rights server 35, where it is compared with the location of installation, LOC, in the database 50. If the values of LOC and LOC-B are not the same, then this is an indication that the NFC tag 75 or the surface 85 was moved between the times of installation and reading, which may be a factor in denying access for the guest device B to the access point AP. By coupling the NFC tag 75 or barcode 85 with the installed location used by the owner during setup, the access rights server may confirm that the NFC tag has not been moved. If guest device B is able to report to the access rights server 35, the same location for both installation and reading of the NFC tag 75 or barcode 85, then the access may be granted.

FIG. 1F shows the example network diagram of FIG. 1E, wherein the access rights server 35 transmits the credentials "Password(AP)(B)" to guest wireless device B and also transmits these credentials at 100 via the infrastructure network 37 to the access point AP. The figure also show the access point AP allowing the guest device B to gain access at 102 by using the credentials, in accordance with example embodiments of the invention.

FIG. 1G shows the example network diagram of FIG. 1F, wherein the access rights server 35 receives a notice 110 from owner/manager of device A to revoke the access rights of guest device B. The figure shows the access rights server 35 transmitting a message 120 to guest device B to delete the password. The figure also shows optionally transmitting a revocation notice at 115 via the infrastructure network 37 to the access point AP, thereby changing the access rights of device B without altering the URL expression "URL for AP" in the NFC tag 75 or the two-dimensional barcode 85, in accordance with example embodiments of the invention.

Figure 2:
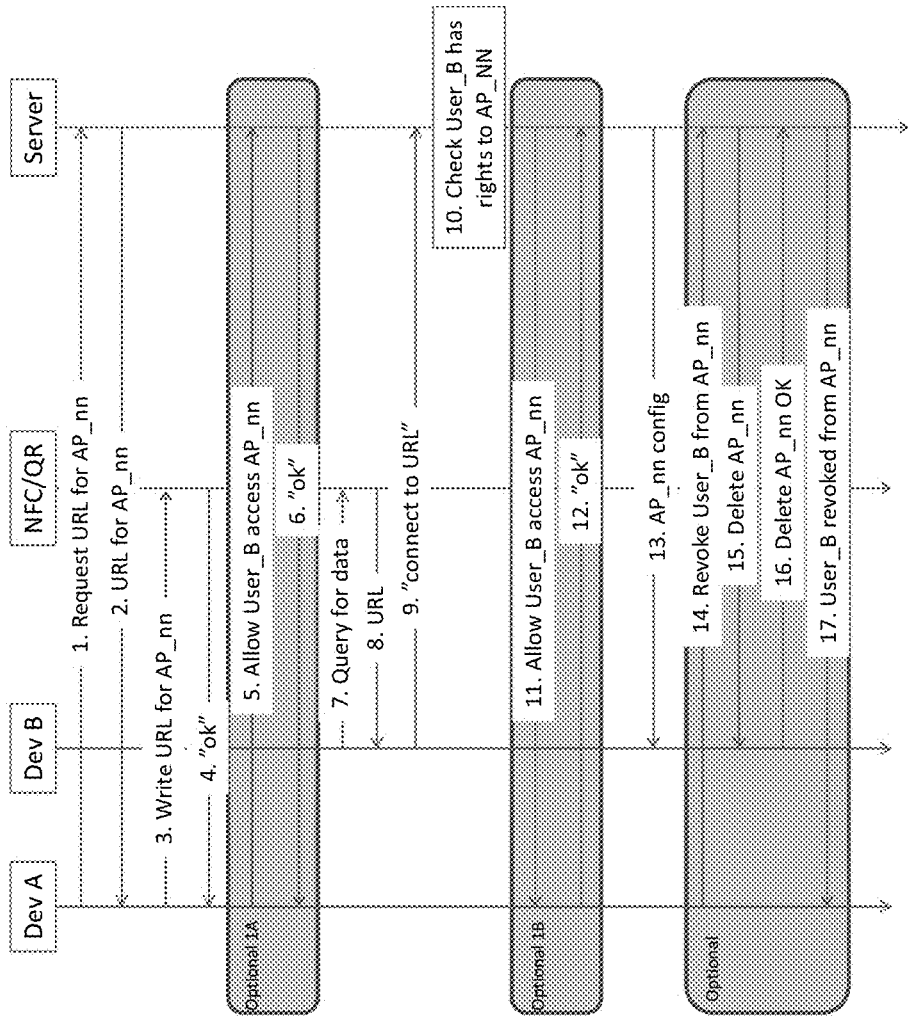
FIG. 2 is an example sequence diagram of the interaction between the access rights server, the owner/manager device A, and the guest device B, in accordance with example embodiments of the invention.

FIG. 2 is an example sequence diagram of the interaction between the access rights server, the owner/manager device A, and the guest device B, in accordance with example embodiments of the invention. As an operational example, assume Susan (device A in FIG. 2) wants to setup easy sharing option for her enterprise WLAN network to provide the internet access for her clients while they are visiting the company premises. She uses the access sharing platform that combines the storage of user-defined network access credentials in an access rights server, with fixed URL addresses written by the user on machine-readable media that are available to guest devices, in accordance with an embodiment of the invention. Susan's device A offers the option to share her company WLAN network called USS_Enterprise using NFC tags or QR codes. When she chooses to share the network with QR codes, the client software running on her device A sends a request to the access rights server 35 to provide a unique URL address to enable sharing of the particular WLAN network. The access rights server 35 server sends back to the client the unique URL and stores the information to its database 50. Next, Susan is provided with an option to print the QR codes. She prints the QR code on 20 cards 85 having an adhesive backing and sticks those to the meeting rooms and corridors of her enterprise premises. Next, a guest Mark (device B) comes to visit Susan's enterprise. He notices the QR code at the reception desk and points his device to the code. The software client on his device B detects the code, opens the URL provided by the QR code, and adds his personal identifier to the URL. The access rights server 35 notifies Susan's device A that User Mark is accessing the specific URL that is used to configure access network that User Susan called USS_Enterprise. Next, there are two options: 1) If Susan indicated the list of users who can access her enterprise WLAN network beforehand (for example, saying all her friends in the social network server 36 may have automatic access) and Mark belongs to this list, the access rights server 35 automatically configures the USS_Enterprise network to allow access by Mark's device B. Option 2): If Mark is not listed to have access rights to the network, the access rights server 35 asks the owner of the network (Susan), to either approve or deny Mark's access. Upon approval, the access rights server 35 will configure the USS_Enterprise network to accept an access by Mark's device automatically and Mark may start using the network.

When something goes wrong with the business relationship between Susan and Mark, Susan decides that Mark is no longer approved to use her corporate network, so she removes the access rights from Mark. This causes the access rights server 35 to automatically revoke the access from Mark's device B, and Susan does not need to update, change or modify the original QR codes.

Figure 3A:
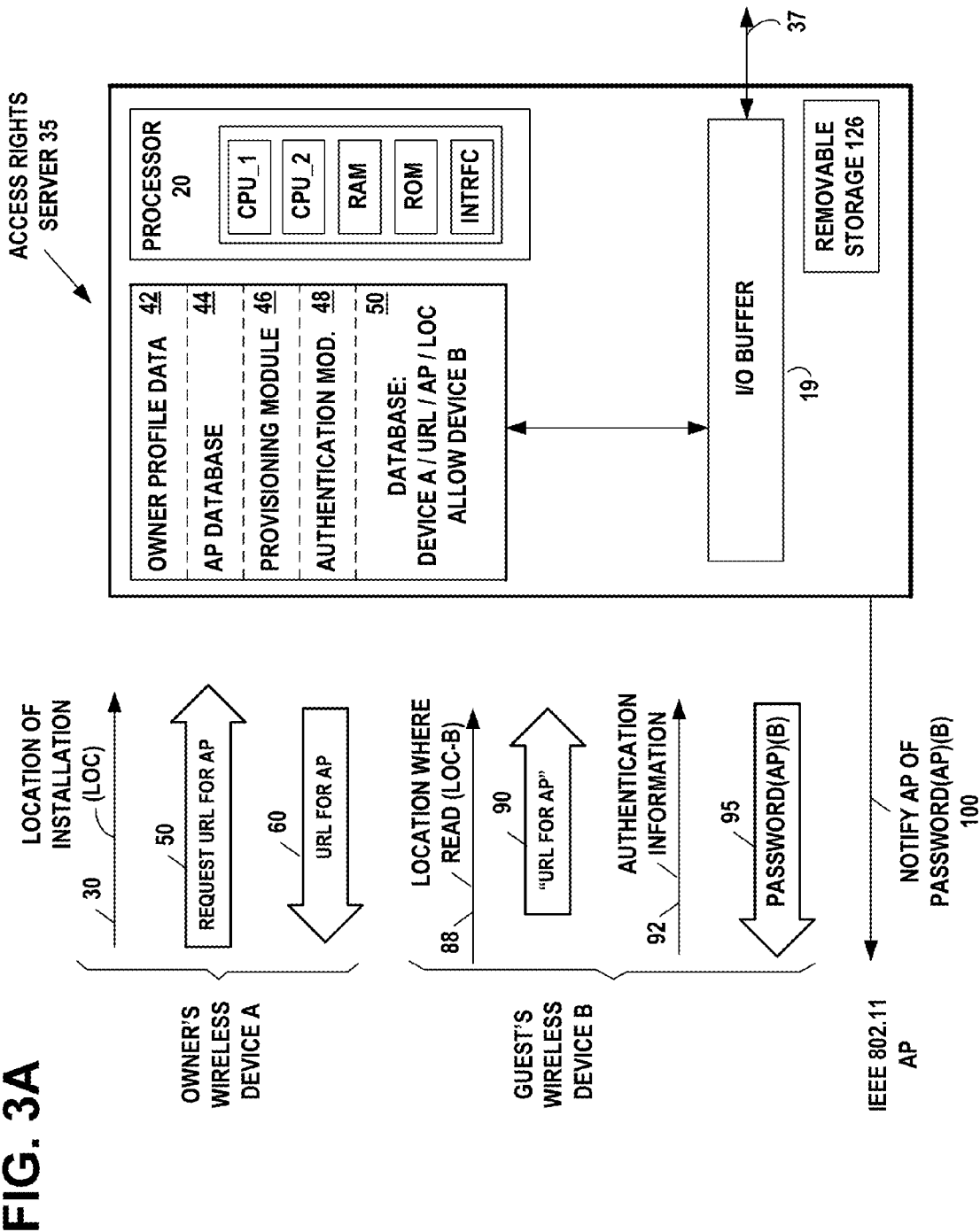
FIG. 3A is an example functional block diagram of the access rights server in granting the access rights to the guest device B, in accordance with example embodiments of the invention.

FIG. 3A is an example functional block diagram of the access rights server 35 in granting the access rights to the guest device B, in accordance with example embodiments of the invention. The access rights server includes the processor 20, I/O buffer 19 connected to the infrastructure bus 37, and the removable storage 126. Messages 30, 50 and 60 are shown exchanged with the owner's wireless device A. Messages 88, 90, 92 and 95 are shown exchanged with the guest's device B. Notice 100 is shown transmitted to the access point AP.

Figure 3B:
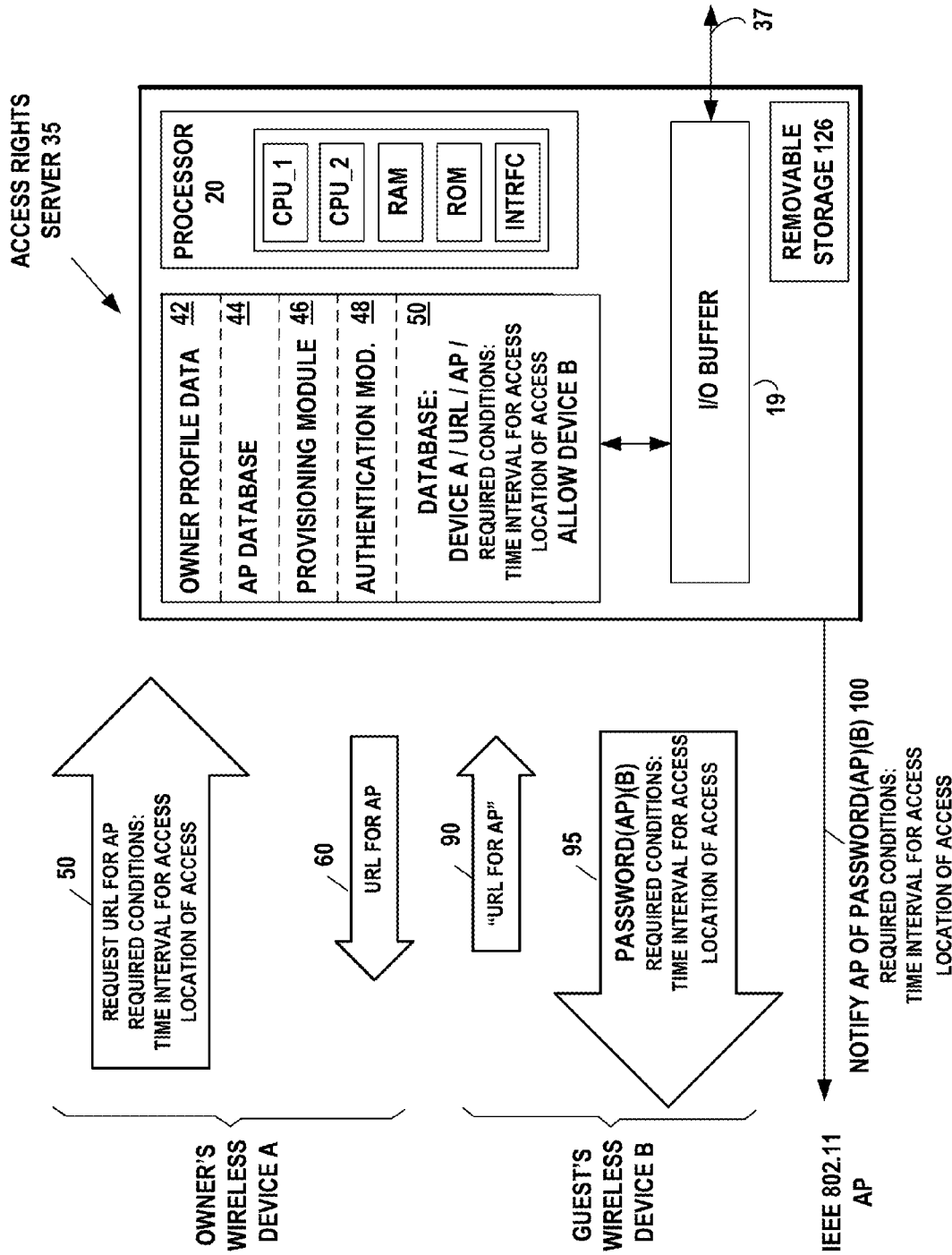
FIG. 3B is an example functional block diagram of the access rights server in granting the access rights to the guest device B, wherein the URL transmitted by the owner/manager device A, includes condition information specified by the owner/manager device A to be stored in the storage partition in the database of the access rights server, which is at least one of a specification of an interval within which the guest device may access the access point and a specification of a location of the guest device when accessing the access point, in accordance with example embodiments of the invention.

FIG. 3B is an example functional block diagram of the access rights server in granting the access rights to the guest device B, wherein the URL transmitted by the owner/manager device A in message 50, includes condition information specified by the owner/manager device A to be stored in the storage partition in the database of the access rights server, which is at least one of a specification of an interval within which the guest device may access the access point and a specification of a location of the guest device when accessing the access point, in accordance with example embodiments of the invention. The credentials transmitted in the message 95 to the guest device B includes condition information specified by the owner/manager device A to be stored in the storage partition in the database of the access rights server. Notice 100 is shown transmitted to the access point AP also includes condition information specified by the owner/manager device A to be stored in the storage partition in the database of the access rights server.

Figure 3C:
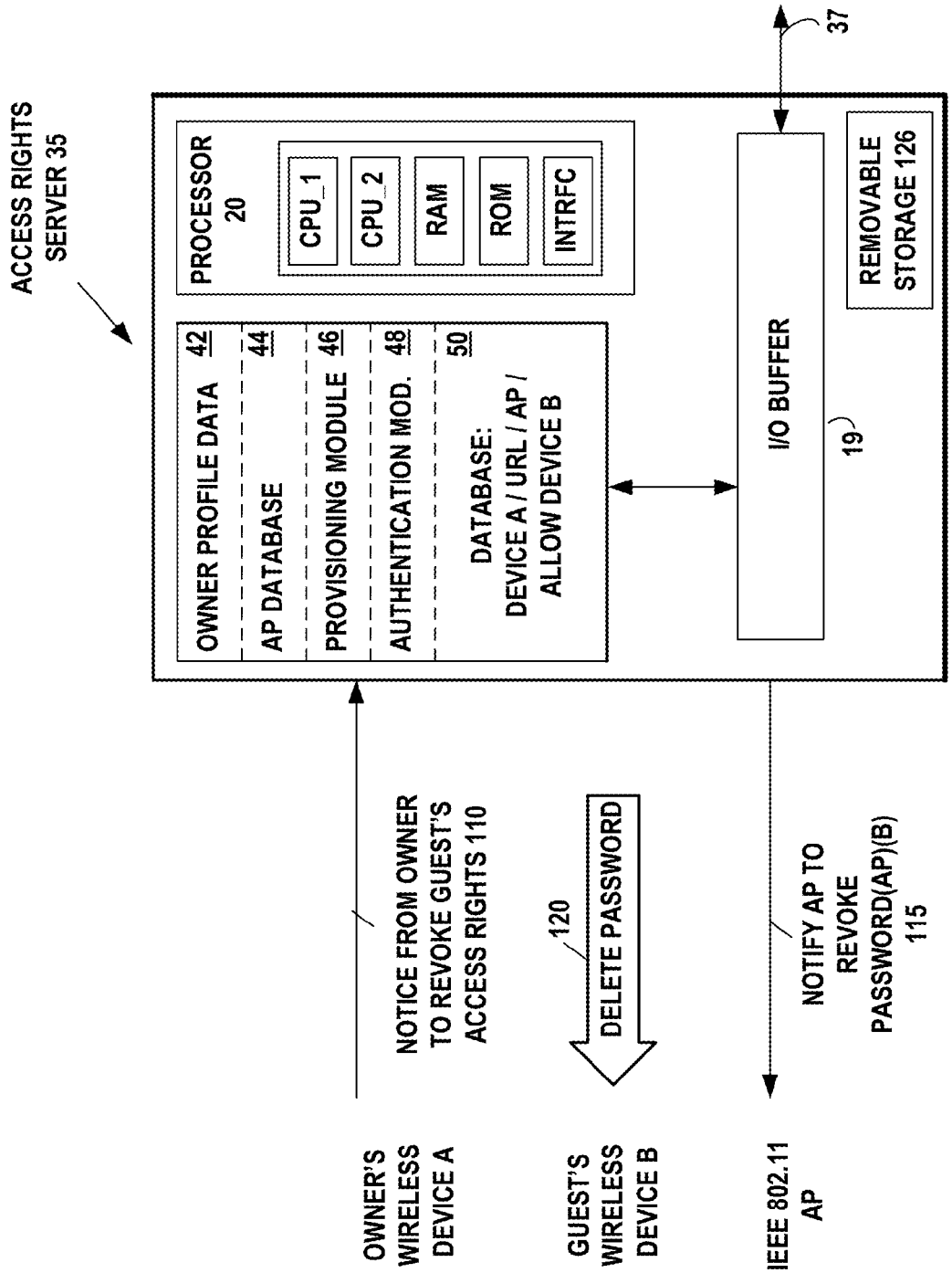
FIG. 3C is an example functional block diagram of the access rights server in revoking the access rights of the guest device B, in accordance with example embodiments of the invention.

FIG. 3C is an example functional block diagram of the access rights server 35 in revoking the access rights of the guest device B, in accordance with example embodiments of the invention. The access rights server 35 receives a notice 110 from the user of the wireless device A, to revoke the access rights of the guest device B and, in response, the access rights server 35 transmits a message 120 to the guest device B to delete the credentials. The access rights server 35 may also transmit a message 115 to the access point AP to change the access rights of the guest device B to deny access.

FIG. 4A is an example flow diagram 400 of operational steps of an example embodiment of the method carried out the wireless device A, according to an embodiment of the present invention. The steps of the flow diagram represent computer code instructions stored in the RAM and/or ROM memory of the wireless device A, which when executed by the central processing units (CPU), carry out the functions of the example embodiments of the invention. The steps may be carried out in another order than shown and individual steps may be combined or separated into component steps. Additional steps may be included in this sequence. The steps of the example method are as follows.

Step 402: transmitting by a first wireless device, to an access rights server, a wireless message including a request for accessing information to address a storage partition in a database associated with the access rights server, which stores credentials to access an access point that is owned or managed by a user of the first device;

Step 404: receiving by the first wireless device a responsive wireless message from the access rights server, including accessing information enabling guest devices to obtain access rights for the access point from the storage partition in the database associated with the access rights server, the storage partition being accessible with the accessing information; and Step 406: writing by the first wireless device, data into a machine-readable medium, including the accessing information, to enable a guest wireless device that has read the accessing information from the machine-readable medium, to obtain from the access rights server, access rights to access the access point, based on the accessing information.

In example embodiments of the invention the method further comprises:

wherein the wireless message transmitted by the first device to the access rights server, includes condition information specified by the first device to be stored in the storage partition in the database, which is at least one of a specification of an interval within which the guest device may access the access point and a specification of a location of installation of the machine readable medium.

FIG. 4B is an example flow diagram 450 of operational steps of an example embodiment of the method carried out the wireless device B, according to an embodiment of the present invention. The steps of the flow diagram represent computer code instructions stored in the RAM and/or ROM memory of the wireless device A, which when executed by the central processing units (CPU), carry out the functions of the example embodiments of the invention. The steps may be carried out in another order than shown and individual steps may be combined or separated into component steps. Additional steps may be included in this sequence. The steps of the example method are as follows.

Step 452: reading, by a guest wireless device, data from a machine readable medium, including accessing information, to enable the guest wireless device to obtain credentials from an access rights server, to access an access point, based on the accessing information;

Step 454: transmitting by the guest wireless device, a wireless message to the access rights server, requesting credentials to enable accessing the access point, the request including the accessing information, the accessing information addressing a storage partition in a database associated with the access rights server, the storage partition being accessible with the accessing information; and Step 456: receiving by the guest wireless device from the access rights server, the credentials to enable the guest wireless device to gain access to the access point by using the credentials.

In example embodiments of the invention the method further comprises:

transmitting, by the guest wireless device, authentication information to the access rights server, to enable the access rights server to authenticate the guest wireless device.

In example embodiments of the invention the method further comprises:

storing, by the guest device, a location indication representing a location where the guest wireless device read the data from the machine readable medium; and transmitting, by the guest wireless device to the access rights server, the location information to confirm that the machine-readable medium was not moved from a location where it was installed.

FIG. 4C is an example flow diagram 470 of operational steps of an example embodiment of the method carried out the wireless device A, according to an embodiment of the present invention. The steps of the flow diagram represent computer code instructions stored in the RAM and/or ROM memory of the wireless device A, which when executed by the central processing units (CPU), carry out the functions of the example embodiments of the invention. The steps may be carried out in another order than shown and individual steps may be combined or separated into component steps. Additional steps may be included in this sequence. The steps of the example method are as follows.

Step 472: transmitting by a first device, to an access rights server, a message including a request for access information to address a storage partition in a database associated with the access rights server, which stores credentials to access a wireless access point or network that is owned or managed by a user of the first device;

Step 474: receiving by the first device a responsive message from the access rights server, including access information enabling guest devices to obtain access rights for the wireless access point or network from the storage partition in the database associated with the access rights server; and Step 476: providing, by the first device, the access information to a guest device to enable the guest device to obtain from the access rights server, access rights to access the wireless access point or network, based on the access information.

FIG. 4D is an example flow diagram 490 of operational steps of an example embodiment of the method carried out the wireless device B, according to an embodiment of the present invention. The steps of the flow diagram represent computer code instructions stored in the RAM and/or ROM memory of the wireless device A, which when executed by the central processing units (CPU), carry out the functions of the example embodiments of the invention. The steps may be carried out in another order than shown and individual steps may be combined or separated into component steps. Additional steps may be included in this sequence. The steps of the example method are as follows.

Step 492: reading, by a guest wireless device, data from a machine readable medium, including accessing information, to enable the guest wireless device to obtain credentials from an access rights server, to access a wireless access point or network, based on the accessing information;

Step 494: transmitting by the guest wireless device, a wireless message to the access rights server, requesting credentials to enable accessing the wireless access point or network, the request including the accessing information, the accessing information addressing a storage partition in a database associated with the access rights server, the storage partition being accessible with the accessing information; and Step 496: receiving by the guest wireless device from the access rights server, the credentials to enable the guest wireless device to gain access to the wireless access point or network by using the credentials.

Figure 4E:
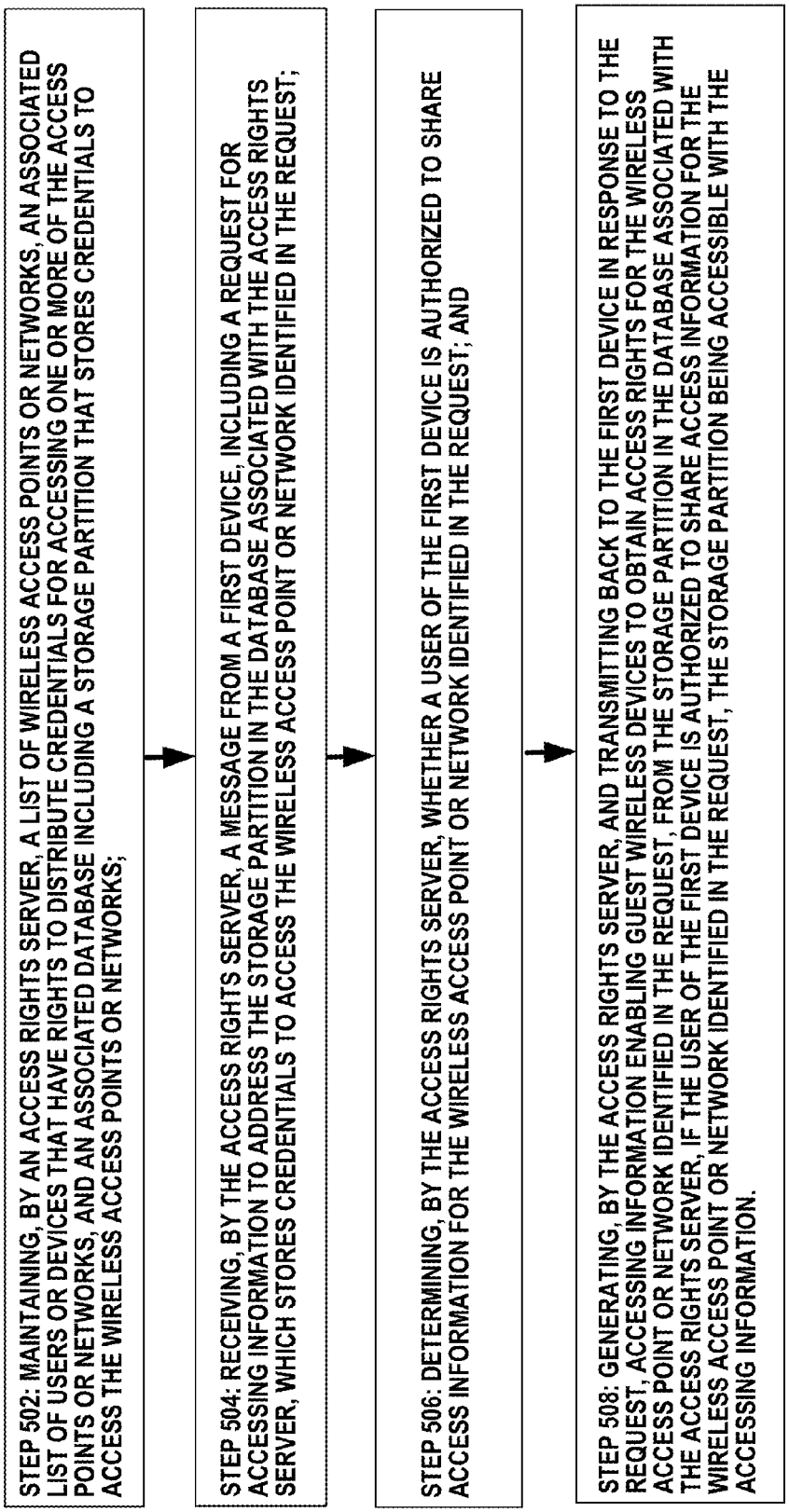
FIG. 4E is an example flow diagram of operational steps of an example embodiment of the method carried out the access rights server, according to an embodiment of the present invention.

FIG. 4E is an example flow diagram 500 of operational steps of an example embodiment of the method carried out the access rights server, according to an embodiment of the present invention. The steps of the flow diagram represent computer code instructions stored in the RAM and/or ROM memory of the wireless device A, which when executed by the central processing units (CPU), carry out the functions of the example embodiments of the invention. The steps may be carried out in another order than shown and individual steps may be combined or separated into component steps. Additional steps may be included in this sequence. The steps of the example method are as follows.

Step 502: maintaining, by an access rights server, a list of wireless access points or networks, an associated list of users or devices that have rights to distribute credentials for accessing one or more of the access points or networks, and an associated database including a storage partition that stores credentials to access the wireless access points or networks;

Step 504: receiving, by the access rights server, a message from a first device, including a request for accessing information to address the storage partition in the database associated with the access rights server, which stores credentials to access the wireless access point or network identified in the request;

Step 506: determining, by the access rights server, whether a user of the first device is authorized to share access information for the wireless access point or network identified in the request; and Step 508: generating, by the access rights server, and transmitting back to the first device in response to the request, accessing information enabling guest wireless devices to obtain access rights for the wireless access point or network identified in the request, from the storage partition in the database associated with the access rights server, if the user of the first device is authorized to share access information for the wireless access point or network identified in the request, the storage partition being accessible with the accessing information.

The following additional of operational steps may be carried out by an example embodiment of the method performed by the access rights server, according to an embodiment of the present invention.

Receiving, by the access rights server, from a guest wireless device, a message requesting credentials to enable accessing the wireless access point or network, the request including the accessing information to address the storage partition in the database associated with the access rights server, the request further including authentication information to enable the access rights server to authenticate the guest wireless device;

Authenticating, by the access rights server, the guest wireless device; and

Transmitting, by the access rights server, the credentials to the guest wireless device to enable it to gain access to the wireless access point or network by using the credentials.

Figure 5A:
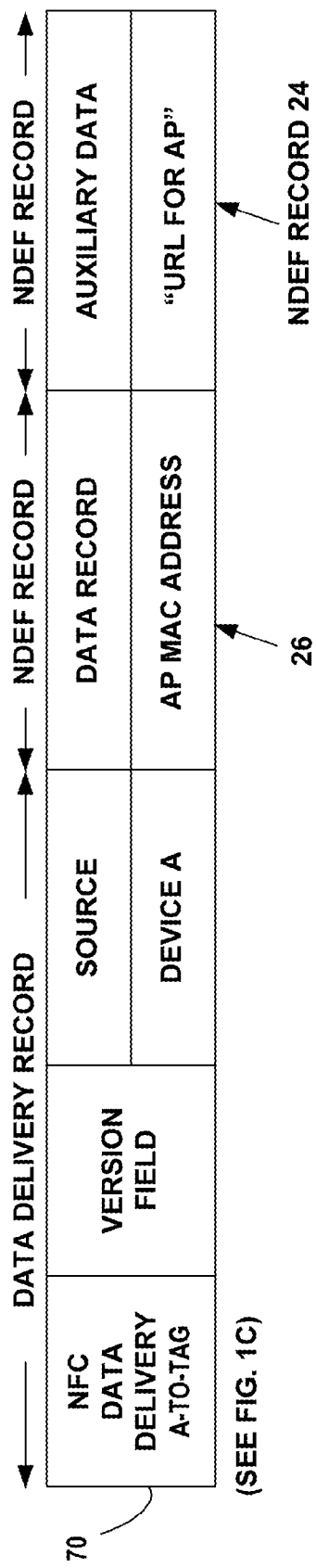
FIG. 5A is an example embodiment of one example an NFC data delivery message sent from owner/manager wireless device A to the NFC tag in FIG. 1C, to write data into the NFC tag, including the URL expression "URL for AP", according to an embodiment of the present invention.

FIG. 5A is an example embodiment of one example an NFC data delivery message 70 sent from owner/manager wireless device A to the NFC tag 75 in FIG. 1C, to write data into the NFC tag 75, including the URL expression "URL for AP", according to an embodiment of the present invention. The example message 70 may include a field identifying the source as device A, field 26 providing the MAC address of the access point AP, and a field 24 containing the URL expression "URL for AP".

Figure 5B:
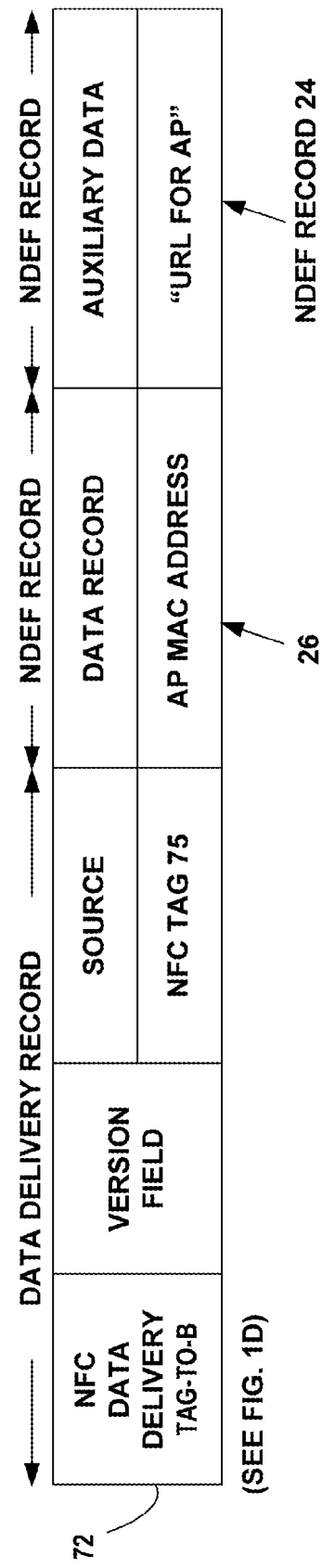
FIG. 5B is an example embodiment of one example an NFC data delivery message sent from the NFC tag to guest wireless device B in FIG. 1D, to enable the wireless device B to read data from the NFC tag, including the URL expression "URL for AP", according to an embodiment of the present invention.

FIG. 5B is an example embodiment of one example an NFC data delivery message 72 sent from the NFC tag 75 to guest wireless device B in FIG. 1D, to enable the guest wireless device B to read data from the NFC tag 75, including the URL expression "URL for AP", according to an embodiment of the present invention. The example message 72 may include a field identifying the source as NFC Tad 75, field 26 providing the MAC address of the access point AP, and a field 24 containing the URL expression "URL for AP".

FIG. 6 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In alternate example embodiments of the invention, RFID transponders may be used in devices A and B, which may be the passive type or the active type, instead of the NFC transponders. A passive RFID transponder requires no internal power source to communicate with an RFID reader, and is only active when it is near an RFID reader that energizes the transponder with a continuous radio frequency signal at a resonant frequency of the antenna. The small electrical current induced in the antenna by the continuous radio frequency signal provides enough power for an integrated circuit in the transponder to power up and transmit a modulated response, typically by backscattering the continuous carrier wave from the RFID reader. A passive RFID transponder may include writable electrically erasable, programmable, read-only memory (EEPROM) for storing data received from the RFID reader, which modulates the continuous carrier wave sent by the RFID reader. Reading distances for passive RFID transponders typically range from a few centimeters to a few meters, depending on the radio frequency and antenna design. By contrast, active RFID transponders require a power source to receive and transmit information with an RFID reader. The RFID transponder may be affixed to or integrated with the wireless device A and device B and the user brings the RFID transponder on the device A close to an RFID reader circuit in device B to allow near field communication between the devices. In example embodiments, both devices A and B may have RFID reader circuits to read RFID signals from the other device.

In an example embodiment, the wireless transceiver carrier in device A and device B may be a suitable short-range communications protocol, such as Radio Frequency Identification (RFID), Near Field Communication (NFC), Infrared Data Association (IrDA), or Ultra Wide Band (UWB), for example.

An example of the Radio Frequency Identification (RFID) out-of-band short-range carrier is described, for example, ISO 11785 (air interface protocol), ISO 14443 (air interface protocol), and ISO 15693, incorporated herein by reference.

An example of the Near Field Communication (NFC) out-of-band short-range carrier is described, for example, in ISO/IEC 14443 and ISO/IEC 18092, incorporated herein by reference.

An example of the Infrared Data Association (IrDA) out-of-band short-range carrier is described, for example, in *IrDA Link Access Protocol*, v1.1 (1996), incorporated herein by reference.

An example of the Ultra Wide Band (UWB) out-of-band short-range carrier is described, for example, in *WiMedia Common Radio Platform Specification*, Version 1.5 (2010), incorporated herein by reference.

In example embodiments, the wireless transceiver carrier in device A, device B, and the access point AP may be a suitable communications protocol, such as a Vehicle Area (WVAN) communications protocol, Wireless Video Networks (WVAN-TV) communications protocol, Personal Area (WPAN) communications protocol, Local Area (WLAN) communications protocol, or Wide Area (WAN) communications protocol, using the standard procedures and primitives defined by the respective standards. Personal Area (WPAN) communications protocols include Bluetooth BR/EDR, Bluetooth Low Energy, Wireless USB (WUSB), Ultra Wide-band (UWB), ZigBee (IEEE 802.15.4, or IEEE 802.15.4a) for short range communication between devices. Local Area (WLAN) communications protocols include digital enhanced cordless telecommunications (DECT) and HIPERLAN. Wide Area (WAN) communications protocols include Global System for Mobile Communications (GSM), General Packet Radio service (GPRS), Enhanced data rates for GSM evolution (EDGE), Evolution-Data Optimized (EV-DO), and Wideband Code Division Multiple Access (W-CDMA).

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:
1. A method, comprising:
  transmitting, by a first device, to an access rights server a message including a request for access information to address a storage partition in a database associated with the access rights server, which stores credentials to access a wireless access point or network identified in the request, wherein the request is for access information to enable a guest device to access the identified wireless network;
  receiving, by the first device, a responsive message from the access rights server, including access information enabling guest devices to obtain access rights for the wireless access point or network from the storage partition in the database associated with the access rights server, if a user of the first device is authorized to share access information for the wireless access point or network; and
  providing, by the first device, the access information to a guest device, the access information causing the guest device to contact the access rights server, to enable the guest device to address the storage partition in the database associated with the access rights server, to obtain the credentials stored in the database associated with the access rights server as access rights to access the wireless access point or network identified in the request, based on the access information.

2. The method of claim 1, further comprising:
writing by the first wireless device, data into a machine-readable medium, including the access information, to enable a guest device to obtain from the access rights server, access rights to access the wireless access point or network, based on the access information in response to reading the access information from the machine-readable medium.

3. The method of claim 2, wherein the message transmitted by the first device to the access rights server, includes condition information specified by the first device to be stored in the storage partition in the database, which is at least one of a specification of an interval within which the guest device may access the wireless access point or network and a specification of a location of installation of the machine readable medium.

4. The method of claim 1, wherein the user of the first device is an owner or manager of the wireless access point or network identified in the request.

5. An apparatus, comprising:
at least one processor;
at least one memory including computer program code;
the at least one memory and the computer program code configured to, with the at least one processor, cause the apparatus at least to:
transmit to an access rights server a message including a request for access information to address a storage partition in a database associated with the access rights server, which stores credentials to access a wireless access point or network identified in the request, wherein the request is for access information to enable a guest device to access the identified wireless network;
receive a responsive message from the access rights server, including access information enabling guest devices to obtain access rights for the wireless access point or network from the storage partition in the database associated with the access rights server, if a user of the apparatus is authorized to share access information for the wireless access point or network; and
provide the access information to a guest device, the access information causing the guest device to contact the access rights server, to enable the guest device to address the storage partition in the database associated with the access rights server, to obtain the credentials stored in the database associated with the access rights server as access rights to access the wireless access point or network identified in the request, based on the access information.

6. The apparatus of claim 5, further comprising:
the at least one memory and the computer program code configured to, with the at least one processor, cause the apparatus at least to:
write data into a machine-readable medium, including the access information, to enable a guest device to obtain from the access rights server, access rights to access the wireless access point or network, based on the access information in response to reading the access information from the machine-readable medium.

7. The apparatus of claim 6, wherein the machine-readable medium is at least one of a near field communication tag and a two-dimensional barcoded surface.

8. A computer program product comprising computer executable program code recorded on a computer readable non-transitory storage medium, the computer executable program code comprising:
code for transmitting, by a first device, to an access rights server a message including a request for access information to address a storage partition in a database associated with the access rights server, which stores credentials to access a wireless access point or network identified in the request, wherein the request is for access information to enable a guest device to access the identified wireless network;
code for receiving, by the first device, a responsive message from the access rights server, including access information enabling guest devices to obtain access rights for the wireless access point or network from the storage partition in the database associated with the access rights server, if a user of the first device is authorized to share access information for the wireless access point or network; and
code for providing, by the first device, the access information to a guest device, the access information causing the guest device to contact the access rights server, to enable the guest device to address the storage partition in the database associated with the access rights server, to obtain the credentials stored in the database associated with the access rights server as access rights to access the wireless access point or network identified in the request, based on the access information.

9. A method comprising:
reading, by a guest wireless device, data from a machine readable medium, including accessing information, the accessing information causing the guest wireless device to contact an access rights server, to enable the guest wireless device to address a storage partition in a database associated with the access rights server, to obtain credentials stored in the database associated with the access rights server, to access a wireless access point or network identified in a request by the guest wireless device, based on the accessing information;
transmitting by the guest wireless device, a wireless message to the access rights server, requesting credentials to enable accessing the wireless access point or network, the request including the accessing information, the accessing information addressing the storage partition in the database associated with the access rights server, the storage partition being accessible with the accessing information; and
receiving by the guest wireless device from the access rights server, the credentials to enable the guest wireless device to gain access to the wireless access point or network by using the credentials.

10. The method of claim 9, further comprising:
storing, by the guest device, a location indication representing a location where the guest wireless device read the data from the machine readable medium; and
transmitting, by the guest wireless device to the access rights server, the location information to confirm that the machine-readable medium was not moved from a location where it was installed.

11. The method of claim 9, wherein the credentials received by the guest device, include a specification of an interval within which the guest device may access the wireless access point or network.

12. An apparatus, comprising:
at least one processor;
at least one memory including computer program code;
the at least one memory and the computer program code configured to, with the at least one processor, cause the apparatus at least to:
read data from a machine readable medium, including accessing information, the accessing information causing the apparatus to contact an access rights server, to enable the guest wireless device to address a storage partition in a database associated with the access rights server, to obtain credentials stored in the database associated with the access rights server, to access a wireless access point or network identified in a request by the guest wireless device, based on the accessing information;

transmit a wireless message to the access rights server, requesting credentials to enable accessing the wireless access point or network, the request including the accessing information, the accessing information addressing the storage partition in the database associated with the access rights server, the storage partition being accessible with the accessing information; and receive from the access rights server, the credentials to enable the apparatus to gain access to the wireless access point or network by using the credentials.

13. The apparatus of claim 12, further comprising:
the at least one memory and the computer program code configured to, with the at least one processor, cause the apparatus at least to:
store a location indication representing a location where the guest wireless device read the data from the machine readable medium; and
transmit to the access rights server, the location information to confirm that the machine-readable medium was not moved from a location where it was installed.

14. The apparatus of claim 12, wherein the credentials received by the guest device, include a specification of an interval within which the guest device may access the wireless access point or network.

15. A computer program product comprising computer executable program code recorded on a computer readable non-transitory storage medium, the computer executable program code comprising:
code for reading, by a guest wireless device, data from a machine readable medium, including accessing information, the accessing information causing the guest wireless device to contact an access rights server, to enable the guest wireless device to address a storage partition in a database associated with the access rights server, to obtain credentials stored in the database associated with the access rights server, to access a wireless access point or network identified in a request by the guest wireless device, based on the accessing information;
code for transmitting by the guest wireless device, a wireless message to the access rights server, requesting credentials to enable accessing the wireless access point or network, the request including the accessing information, the accessing information addressing the storage partition in the database associated with the access rights server, the storage partition being accessible with the accessing information; and
code for receiving by the guest wireless device from the access rights server, the credentials to enable the guest wireless device to gain access to the wireless access point or network by using the credentials.

16. A method, comprising:
maintaining, by an access rights server, a list of wireless access points or networks, an associated list of users or devices that have rights to distribute credentials for accessing one or more of the access points or networks, and an associated database including a storage partition that stores credentials to access the wireless access points or networks;
receiving, by the access rights server, a message from a first device, including a request for accessing information to address the storage partition in the database associated with the access rights server, which stores credentials to access the wireless access point or network identified in the request, wherein the request is for access information to enable a guest device to access the identified wireless network;
determining, by the access rights server, whether a user of the first device is authorized to share access information for the wireless access point or network identified in the request; and
generating, by the access rights server, and transmitting back to the first device in response to the request, accessing information, the accessing information causing guest wireless devices to contact the access rights server, enabling guest wireless devices to address the storage partition in the database associated with the access rights server, to obtain the credentials stored in the database as access rights for the wireless access point or network identified in the request, from the storage partition in the database associated with the access rights server, if the user of the first device is authorized to share access information for the wireless access point or network identified in the request, the storage partition being accessible with the accessing information.

17. The method of claim 16, further comprising:
receiving, by the access rights server, from a guest wireless device, a message requesting credentials to enable accessing the wireless access point or network, the request including the accessing information to address the storage partition in the database associated with the access rights server, the request further including authentication information to enable the access rights server to authenticate the guest wireless device;
authenticating, by the access rights server, the guest wireless device; and
transmitting, by the access rights server, the credentials to the guest wireless device to enable it to gain access to the wireless access point or network by using the credentials.

18. An apparatus, comprising:
at least one processor;
at least one memory including computer program code;
the at least one memory and the computer program code configured to, with the at least one processor, cause the apparatus at least to:
maintain a list of wireless access points or networks, an associated list of users or devices that have rights to distribute credentials for accessing one or more of the access points or networks, and an associated database including a storage partition that stores credentials to access the wireless access points or networks;
receive a message from a first device, including a request for accessing information to address the storage partition in the database associated with the apparatus, which stores credentials to access the wireless access point or network identified in the request, wherein the request is for access information to enable a guest device to access the identified wireless network;
determine whether a user of the first device is authorized to share access information for the wireless access point or network identified in the request; and
generate and transmit back to the first device in response to the request, accessing information, the accessing information causing guest wireless devices to contact the apparatus, enabling guest wireless devices to address the storage partition in the database associated with the apparatus, to obtain the credentials stored in the database as access rights for the wireless access point or network identified in the request, from the storage partition in the database associated with the access rights server, if the user of the first device is authorized to share access information for the wireless access point or network identified in the request, the storage partition being accessible with the accessing information.

19. The apparatus of claim 18, further comprising:

the at least one memory and the computer program code configured to, with the at least one processor, cause the apparatus at least to:

receive from a guest wireless device, a message requesting credentials to enable accessing the wireless access point or network, the request including the accessing information to address the storage partition in the database associated with the apparatus, the request further including authentication information to enable the access rights server to authenticate the guest wireless device;

authenticate the guest wireless device; and transmit the credentials to the guest wireless device to enable it to gain access to the wireless access point or network by using the credentials.

20. A computer program product comprising computer executable program code recorded on a computer readable non-transitory storage medium, the computer executable program code comprising:

code for maintaining, by an access rights server, a list of wireless access points or networks, an associated list of users or devices that have rights to distribute credentials for accessing one or more of the access points or networks, and an associated database including a storage partition that stores credentials to access the wireless access points or networks;

code for receiving, by the access rights server, a message from a first device, including a request for accessing information to address the storage partition in the database associated with the access rights server, which stores credentials to access the wireless access point or network identified in the request, wherein the request is for access information to enable a guest device to access the identified wireless network;

code for determining, by the access rights server, whether a user of the first device is authorized to share access information for the wireless access point or network identified in the request; and code for generating, by the access rights server, and transmitting back to the first device in response to the request, accessing information, the accessing information causing guest wireless devices to contact the access rights server, enabling guest wireless devices to address the storage partition in the database associated with the access rights server, to obtain the credentials stored in the database as access rights for the wireless access point or network identified in the request, from the storage partition in the database associated with the access rights server, if the user of the first device is authorized to share access information for the wireless access point or network identified in the request, the storage partition being accessible with the accessing information.

21. A method, comprising:

transmitting, by a first device, to an access rights server a message including a request for access information to enable a guest device to address a storage partition in a database associated with the access rights server, which stores credentials to enable the guest device to access a wireless access point or network identified in the request, the access rights server being responsible for automatically checking whether the guest device is authorized to share network credentials;

receiving, by the first device, a responsive message from the access rights server, including access information enabling guest devices to obtain access rights for the wireless access point or network from the storage partition in the database associated with the access rights server, if a user of the first device is authorized to share access information for the wireless access point or network; and providing, by the first device, the access information to a guest device, the access information causing the guest device to contact the access rights server, to enable the guest device to address the storage partition in the database associated with the access rights server, to obtain the credentials stored in the database associated with the access rights server as access rights to access the wireless access point or network identified in the request, based on the access information.

22. The method of claim 1, wherein the message transmitted by the first device to the access rights server, includes condition information that specifies an interval within which the guest device may access the wireless access point or network.

* * * * *